US011909136B2

(12) United States Patent
Chen

(10) Patent No.: US 11,909,136 B2
(45) **Date of Patent: *Feb. 20, 2024**

(54) CONNECTOR WITH CURRENT-SHUNT STRUCTURE, SHUNT DEVICE AND CONNECTOR ASSEMBLY WITH THE SAME

(71) Applicant: Sung-Yu Chen, Taichung (TW)

(72) Inventor: Sung-Yu Chen, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,600

(22) Filed: Mar. 30, 2023

(65) Prior Publication Data

US 2023/0246365 A1 Aug. 3, 2023

Related U.S. Application Data

(63) Continuation of application No. 17/687,685, filed on Mar. 7, 2022, now Pat. No. 11,811,159, which is a (Continued)

(30) Foreign Application Priority Data

Feb. 26, 2021 (TW) ................................ 110106949
Feb. 7, 2022 (TW) ................................ 111104225

(51) Int. Cl.
*H01R 12/70* (2011.01)
*H01R 12/73* (2011.01)
(Continued)

(52) U.S. Cl.
CPC ......... *H01R 12/737* (2013.01); *H01R 12/721* (2013.01); *H01R 13/02* (2013.01)

(58) Field of Classification Search
CPC .... H01R 12/737; H01R 12/721; H01R 12/71; H01R 12/70; H01R 12/778; H01R 12/7088
(Continued)

(56) References Cited

U.S. PATENT DOCUMENTS 5,104,332 A * 4/1992 McCoy .................. H01R 13/28 439/907
5,131,868 A * 7/1992 Forterre ............... H01R 9/0521 439/582

(Continued)

*Primary Examiner* — Harshad C Patel
(74) *Attorney, Agent, or Firm* — Li & Cai Intellectual Property Office

(57) ABSTRACT

A connector, having a shunt structure, includes an insulating housing, a shunt socket and a plurality of electrical terminals. The insulating housing has a first side surface and a second side surface. The first side surface has an input interface provided for insertion of a power supply component along a first direction. The input interface is a rectangle, having a longitudinal direction parallel to a second direction. The first direction is perpendicular to the second direction. The second side surface has an output interface. The shunt socket is located on a third side surface and has a clamping portion on a side wall. Each electrical terminal has a contact portion and a leg. Each contact portion extends into the input interface, and each of the legs extends to the output interface. Some electrical terminals have a shunt contact portion, extending into the shunt socket and electrically connected therewith.

18 Claims, 24 Drawing Sheets

Related U.S. Application Data continuation-in-part of application No. 17/213,177, filed on Mar. 25, 2021, now Pat. No. 11,404,806.

(60) Provisional application No. 63/021,096, filed on May 7, 2020, provisional application No. 63/000,494, filed on Mar. 27, 2020, provisional application No. 63/158,390, filed on Mar. 9, 2021.

(51) Int. Cl.
*H01R 13/02* (2006.01)
*H01R 12/72* (2011.01)

(58) Field of Classification Search
USPC .......................................................... 439/650
See application file for complete search history.

(56) References Cited

U.S. PATENT DOCUMENTS

| | | | | |
|---|---|---|---|---|
| 7,581,972 B2 * | 9/2009 | Daamen | H01R 13/6315 439/249 |
| 8,272,878 B2 * | 9/2012 | Neumetzler | H01R 13/6596 439/61 |
| 8,388,389 B2 * | 3/2013 | Costello | H01R 13/26 439/637 |
| 8,961,201 B2 * | 2/2015 | Griese | H01R 9/2675 439/121 |
| 9,331,409 B2 * | 5/2016 | Naganuma | H01R 12/716 |
| 9,337,597 B2 * | 5/2016 | Daamen | H01R 13/629 |
| 9,559,467 B1 * | 1/2017 | Khorrami | H01R 13/6581 |
| 10,263,351 B2 * | 4/2019 | Fry, Jr. | H01R 43/205 |
| 10,651,578 B2 * | 5/2020 | Li | H01R 25/14 |
| 11,329,410 B2 * | 5/2022 | He | H01R 12/7088 |
| 11,545,775 B2 * | 1/2023 | Liu | H01R 13/187 |
| 11,581,672 B2 * | 2/2023 | Chen | H01R 12/71 |
| 11,811,159 B2 * | 11/2023 | Chen | H01R 13/02 |

* cited by examiner

CONNECTOR WITH CURRENT-SHUNT STRUCTURE, SHUNT DEVICE AND CONNECTOR ASSEMBLY WITH THE SAME

CROSS-REFERENCE TO RELATED PATENT APPLICATION

This application is a Continuation Application of the U.S. application Ser. No. 17/687,685, filed on Mar. 7, 2022 and entitled "ELECTRICAL CONNECTOR", which is a Continuation-In-Part of the U.S. application Ser. No. 17/213,177, filed on Mar. 25, 2021, issued on Aug. 2, 2022 as U.S. patent Ser. No. 11/404,806, and entitled "CONNECTOR HAVING SHUNT STRUCTURE AND SHUNT DEVICE THEREOF". This application claims the benefit of priorities to the U.S. Provisional Patent Application Ser. No. 63/000,494 filed on Mar. 27, 2020, Ser. No. 63/021,096 filed on May 7, 2020, and Ser. No. 63/158,390 filed on Mar. 9, 2021, and the benefit of priorities to Taiwan Patent Application No. 110106949 filed on Feb. 26, 2021 and Ser. No. 11/104,225 filed on Feb. 7, 2022. The entire content of each of the above-identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electrical connector, and in particular, to an electrical connector with an electrical terminal assembly capable of performing a current shunting function.

BACKGROUND OF THE DISCLOSURE

In the prior art, an electrical connector for supplying a current usually transmits the current through only a single output interface. Using a board-side electrical connector as an example, when the board-side electrical connector transmits a current to a circuit board, the current is all shunted by the circuit board for providing a required shunt current to electronic components on the circuit board. However, if a high current is supplied and shunted through the circuit board, a current-carrying capacity of the circuit board needs to be increased. In addition, power loss is caused during shunting of the current through the circuit board.

Therefore, how to improve the supply of board-side electrical connectors by improving a structural design has become an issue to be resolved in this technical field.

SUMMARY OF THE DISCLOSURE

A technical problem to be resolved by the present disclosure is to provide an electrical connector with an electrical terminal assembly capable of performing a current shunting function in view of the disadvantages of the prior art, which can additionally shunt a current to other components in a single electrical connector to save space of an electronic apparatus.

To resolve the foregoing technical problem, one technical solution adopted in the present disclosure is to provide a shunt device, used to be mated with a shunt socket of a connector configured on a circuit board so as to shunt electric current of the connector. The shunt device comprises an insulating housing and a first electrical terminal. The insulating housing has a bottom surface. The first electrical terminal is fixed on the insulating housing, wherein the first electrical terminal has a first plate contact portion that is perpendicular to the bottom surface, for connecting at least one electrical terminal inside the shunt socket to shunt electric current.

To resolve the foregoing technical problem, another technical solution adopted in the present disclosure is to provide a connector having a shunt structure. The connector comprises an insulating housing, a first shunt socket and a plurality of electrical terminals. The insulating housing has a first side surface and a second side surface. The first side surface has an input interface provided for insertion of a power supply component along a first direction, and the second side surface has an output interface, wherein a longitudinal direction of the input interface is parallel to a second direction, and the first direction is perpendicular to the second direction. The first shunt socket is located on a third side surface of the insulating housing and having a clamping portion on a side wall. Each of the electrical terminals has a contact portions and a leg, each of the contact portions extending into the input interface, and each of the legs extending to the output interface. Wherein, a first part of electrical terminals has a shunt contact portion extending into the first shunt socket.

To resolve the foregoing technical problem, still another technical solution adopted in the present disclosure is to provide a connector assembly, comprising a first connector, a second connector, and a first shunt socket. The first connector has a first housing and a plurality of first electrical terminals, wherein the plurality of first electrical terminals commonly define a slot for receiving current provided by a matching component. The first shunt socket is located on a side of the first housing and has a clamping portion on a side wall of the first shunt socket. The second connector has a second housing and at least one second electrical terminal. The at least one second electrical terminal has a plate contact portion, and the second housing has a latch arm. When the second connector is mated with the first shunt socket, the latch arm and the clamping portion are latched together, and the plate contact portion is electrically connected with at least one of the first electrical terminals for shunting current.

In order to further understand the features and technical content of the present disclosure, refer to the following detailed description and drawings about the present disclosure. However, the provided drawings are only for reference and description, and are not used to limit the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
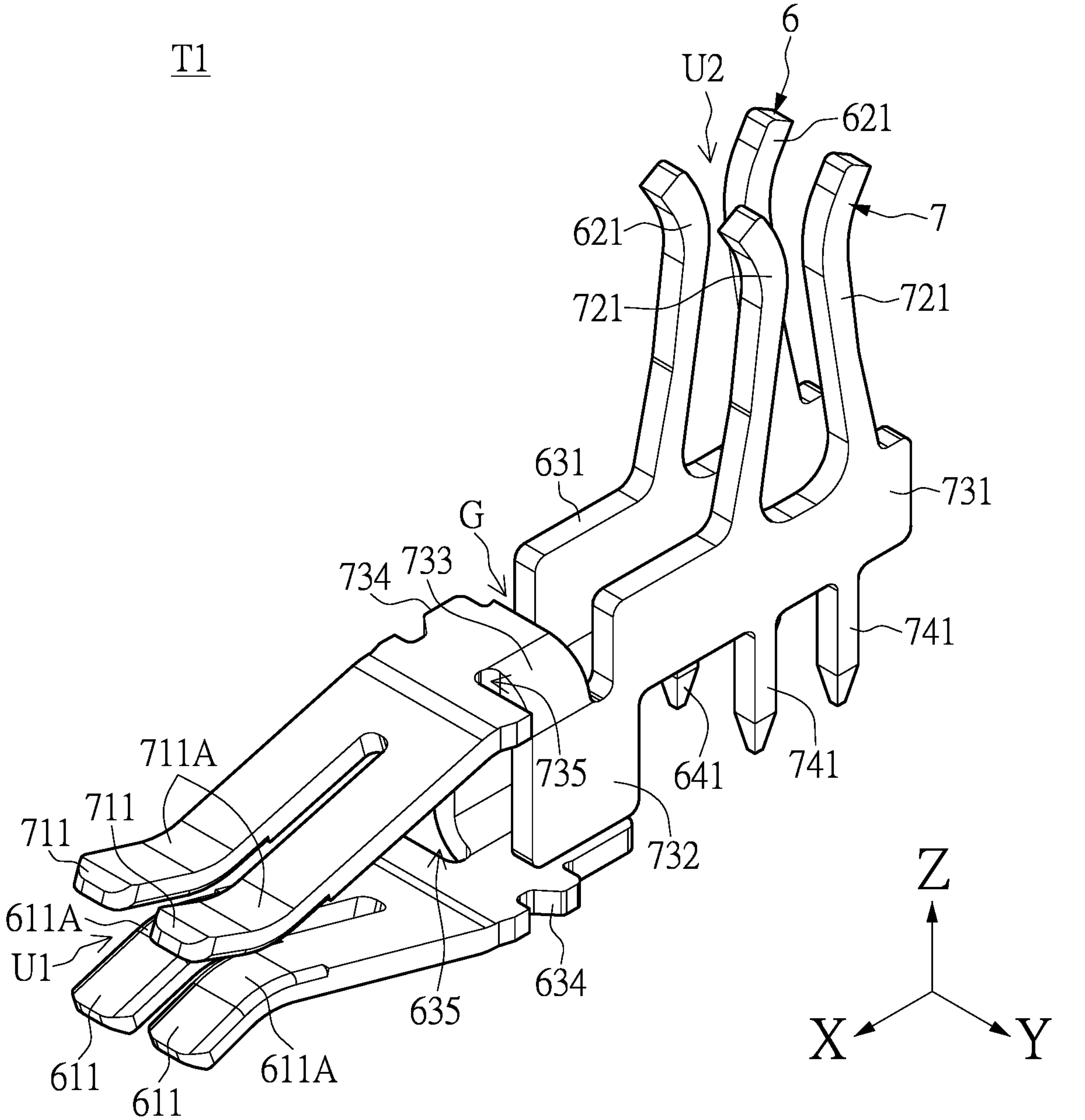
FIG. 1 is a three-dimensional schematic view of an electrical terminal assembly according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The following are specific embodiments for illustrating an implementation of "an electrical terminal assembly and an electrical connector" disclosed in the present disclosure. Those skilled in the art can understand the advantages and effects of the present disclosure from the content disclosed in this specification. The present disclosure can be implemented or applied through other different specific embodiments, and various details in this specification can also be modified and changed based on different viewpoints and applications without departing from the concept of the present disclosure. In addition, as stated in advance, the drawings of the present disclosure are merely simple schematic illustrations, and are not drawn according to actual dimensions. The following embodiments will further describe the related technical content of the present disclosure in detail, but the disclosed content is not intended to limit the protection scope of the present disclosure. In addition, it should be understood that although terms such as "first", "second", and "third" may be used herein to describe various components, these components should not be limited by these terms. These terms are mainly used to distinguish one of components of a same structure from another component. For example, "a first A contact portion", "a second A contact portion", and "a third A contact portion" appearing below refer to naming distinction of a plurality of components with a same structure at different positions in a same embodiment of a component "A contact portion". In addition, the term "or" used herein may include any one or a combination of a plurality of associated listed items, depending on an actual situation.

In the present disclosure, a connector assembly having a shunt structure includes a main connector and a shunt connector. The main connector has an input interface, an output interface, and a shunt interface. The main connector is electrically connected to a power supply component through the input interface located at a first side surface, so as to receive input of electric current or signals and output the received electric current or signals through the output interface located at a second side surface. Further, the received electric current may be partially outputted through the shunt interface located at a third side surface. It should be noted that the first side surface, the second side surface and the third side surface can be a complete surface or a part of a face of the main connector. That is, the first side surface, the second side surface and the third side surface can be located at different faces of the main connector or on the same face. A plurality of electrical terminals is provided in the main connector. An end of the electrical terminals is configured at the input interface, and another end of the electrical terminals is configured at the output interface. In this way, the electric current and/or the signals can be inputted through the input interface, and can then be transmitted to the output interface for output and transmitted to the shunt interface for shunting. Or, there is a plurality of power terminals provided for transmission of the electric current. Through this design, the connector assembly of the present disclosure allows the electric current (i.e., electricity) provided by the power supply component to be shunted in an easy manner, so as to decrease power loss. The power supply component of the connector assembly provided in the present disclosure can be components that are capable of providing the electric current (such as a matching connector or a power supplier), and thus allows for a wide range of application. The present disclosure will be illustrated by various embodiments described below. While naming of components may differ from one embodiment to another due to different application scenarios, the shunting function of the connector assembly is not affected.

First Embodiment

Figure 2:
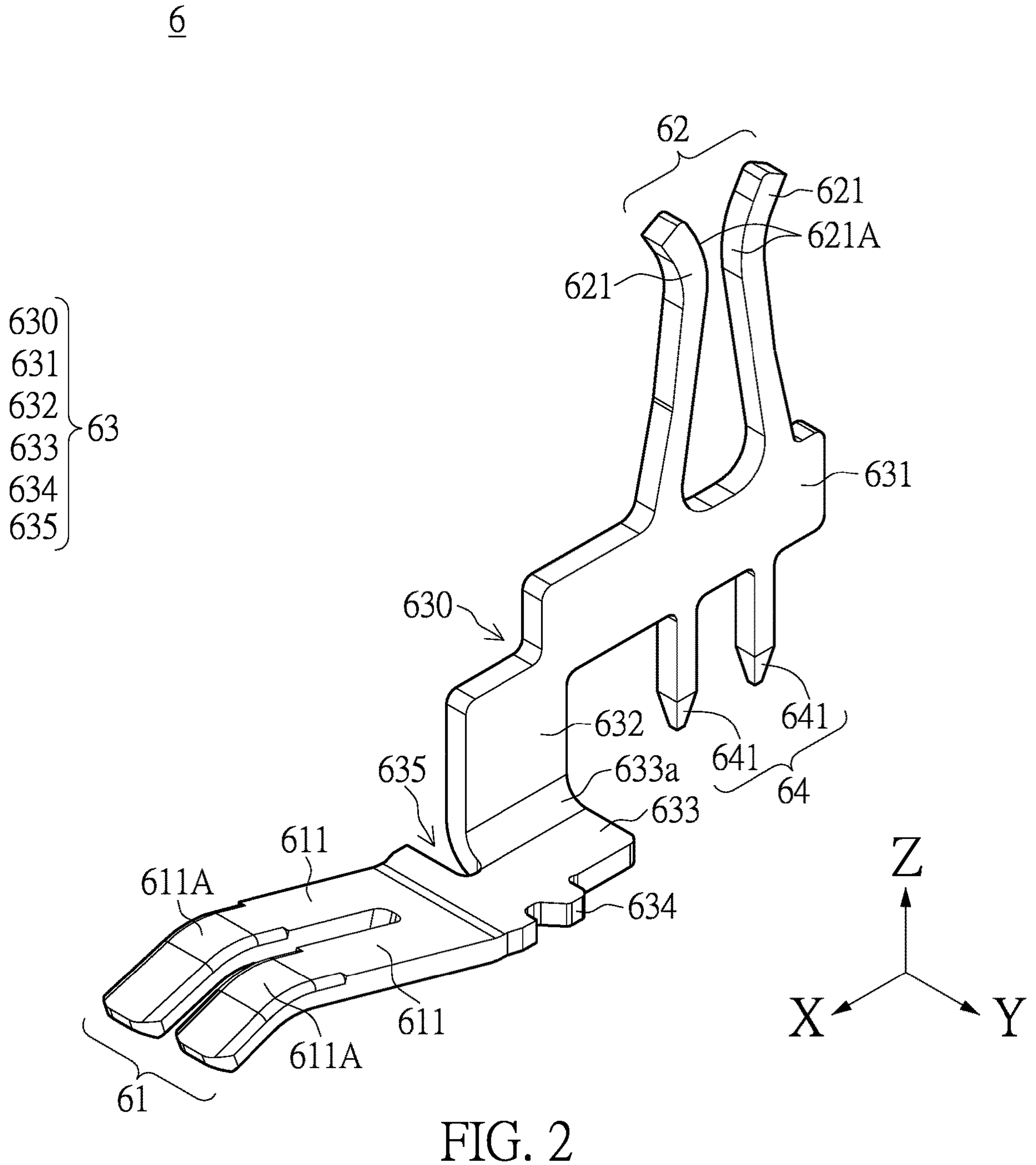
FIG. 2 is a three-dimensional schematic view of a first electrical terminal according to the first embodiment of the present disclosure.
Figure 3:
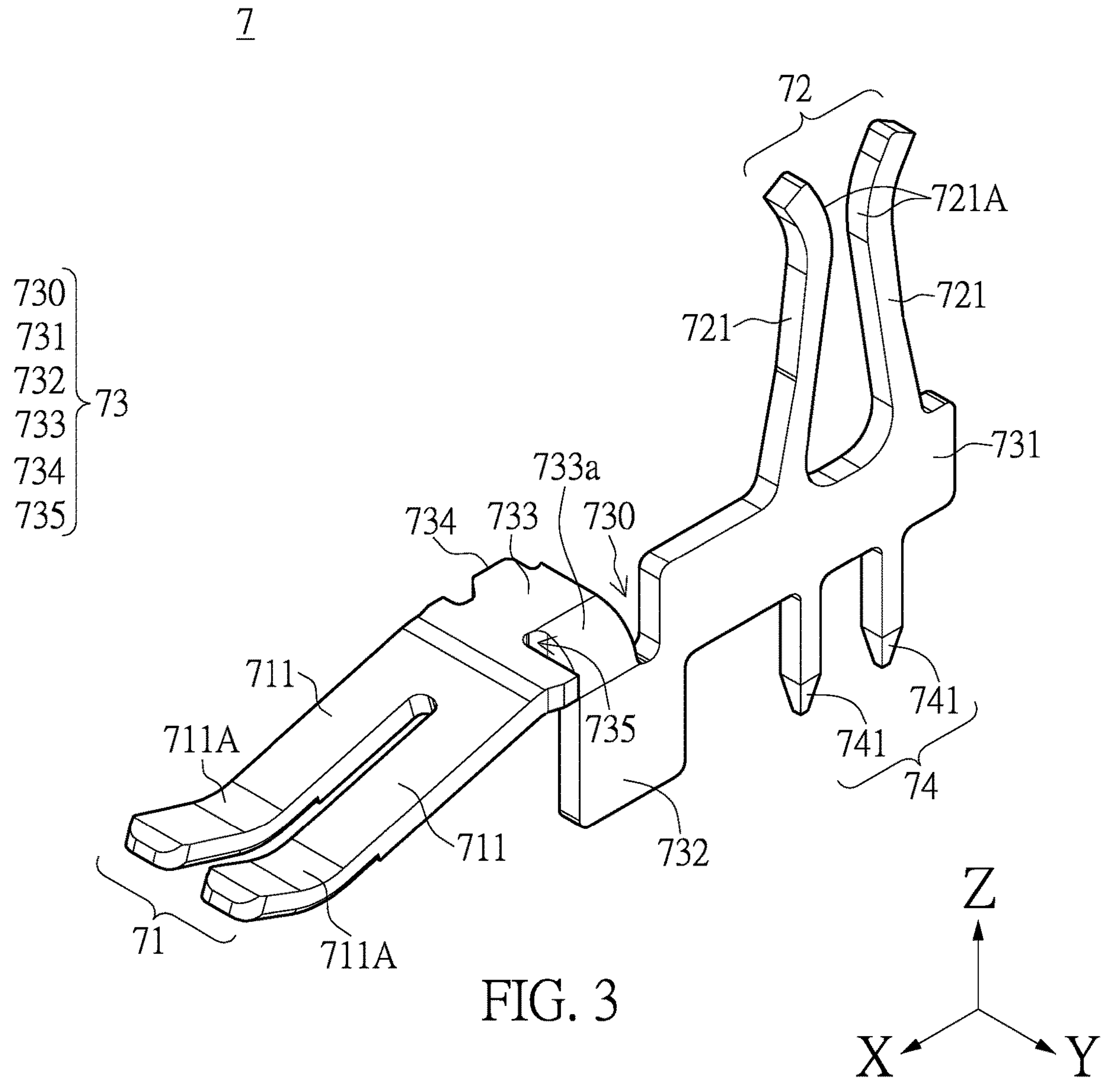
FIG. 3 is a three-dimensional schematic view of a second electrical terminal according to the first embodiment of the present disclosure.

Referring to FIG. 1 to FIG. 3, the first embodiment of the present disclosure provides an electrical terminal assembly T1, which includes a first electrical terminal 6 and a second electrical terminal 7. The first electrical terminal 6 and the second electrical terminal 7 are both integrally formed structures.

FIG. 2 shows the first electrical terminal 6 of this embodiment. The first electrical terminal 6 includes a first A contact portion 61, a first B contact portion 62, a first middle portion 63, and a first pin portion 64. The first A contact portion 61, the first B contact portion 62, and the first pin portion 64 are connected to the first middle portion 63. The first A contact portion 61 includes at least one first A contact arm 611. A quantity of the first A contact arms 611 is not limited in the present disclosure. This embodiment uses two first A contact arms 611 as an example. The first B contact portion 62 includes two first B contact arms 621. The first pin portion 64 includes a plurality of first pins 641. Quantities of the first B contact arms 621 and the first pins 641 are not limited in the present disclosure. The two first B contact arms 621 are mirror symmetrical or substantially mirror symmetrical in shape on opposite sides of a YZ plane. The two first A contact arms 611 extend along a first direction (a positive X-axis direction), the two first B contact arms 621 extend along a second direction (a positive Z-axis direction), and the plurality of first pins 641 extend along a third direction (a negative Z-axis direction). The first direction and the second direction are preferably perpendicular to each other. The second direction and the third direction are preferably parallel to each other. In addition, the two first A contact arms 611 each have a contact region 611A. Two opposite sides of the contact region 611A are circular arc sides, and the two contact regions 611A are preferably different in height in the Z-axis direction.

In continuation of the above, the first middle portion 63 includes a first main body region and a first turning region. The first main body region includes a first section 631 and a second section 632 and is substantially a plane. The first main body region extends along an XZ plane and is connected between the first B contact portion 62 and the first pin portion 64. The first turning region is connected between the first main body region and the first A contact portion 61. The first turning region includes a third section 633. The first section 631 is connected between the first B contact portion 62 and the first pin portion 64. The second section 632 is connected between the first section 631 and the third section 633. The third section 633 is connected between the second section 632 and the first A contact portion 61. Further, the first middle portion 63 has a first notch 630, and the first notch 630 is located between the first section 631 and the second section 632. The second section 632 is bent at a right angle with respect to the first section 631 toward the negative Z-axis direction. The first turning region further has a first turning segment 633*a*, and the first turning segment 633*a* is bent at a right angle with respect to the second section 632 (the first main body region) toward the positive Y-axis direction. In addition, the first middle portion 63 further includes a first positioning member 634. The first positioning member 634 is a bump. The first positioning member 634 is located in the first turning region. The first positioning member 634 extends toward the positive Y-axis direction, and the first positioning member 634 and the second section 632 are respectively connected to two opposite sides of the third section 633. A first groove 635 is formed between the first A contact portion 61 and the first middle portion 63. The first groove 635 is adjacent to a bending region (that is, the first turning segment 633*a*) between the second section 632 and the third section 633. The first section 631 and the third section 633 are respectively connected to two opposite sides of the second section 632 in the Z-axis direction (the second direction). The two first B contact arms 621 and the two first pins 641 are respectively located on two opposite sides of the first section 631.

FIG. 3 shows the second electrical terminal 7 of this embodiment. The second electrical terminal 7 includes a second A contact portion 71, a second B contact portion 72, a second middle portion 73, and a second pin portion 74. The second A contact portion 71, the second B contact portion 72, and the second pin portion 74 are connected to the second middle portion 73. The second A contact portion 71 includes at least one second A contact arm 711. A quantity of the second A contact arms 711 is not limited in the present disclosure. In this embodiment, two second A contact arms 711 are used as an example. The second B contact portion 72 includes two second B contact arms 721. The second pin portion 74 includes a plurality of second pins 741. Quantities of the second B contact arms 721 and the second pins 741 are not limited in the present disclosure. The two second B contact arms 721 are mirror symmetrical or substantially mirror symmetrical in shape on opposite sides of the YZ plane. The two second A contact arms 711 extend along the first direction (the positive X-axis direction). The plurality of second B contact arms 721 extend along the second direction (the positive Z-axis direction). The two second pins 741 extend along the third direction (the negative Z-axis direction). In addition, the two second A contact arms 711 each have a contact region 711A. Two opposite sides of the contact region 711A are circular arc sides, and the two contact regions 711A are preferably different in height in the Z-axis direction.

In continuation of the above, the second middle portion 73 includes a second main body region and a second turning region. The second main body region includes a fourth section 731 and a fifth section 732 and is substantially a plane. The second main body region extends along the XZ plane and is connected between the second B contact portion 72 and the second pin portion 74. The second turning region is connected between the second main body region and the second A contact portion 71. The second turning region includes a sixth section 733. The fourth section 731 is connected between the second B contact portion 72 and the second pin portion 74. The fifth section 732 is connected between the fourth section 731 and the sixth section 733. The sixth section 733 is connected between the fifth section 732 and the second A contact portion 71. The second middle portion 73 has a second notch 730. The second notch 730 is located between the fourth section 731 and the fifth section 732. The fifth section 732 is bent at a right angle with respect to the fourth section 731 toward the negative Z-axis direction. The second turning region further has a second turning segment 733*a*. The second turning segment 733*a* is bent at a right angle with respect to the fifth section 732 (the second main body region) toward the negative Y-axis direction. In addition, the second middle portion 73 further includes a second positioning member 734. The second positioning member 734 is a bump. The second positioning member 734 is located in the second turning region and extends toward the negative Y-axis direction, and the second positioning member 734 and the fifth section 732 are respectively connected to two opposite sides of the sixth section 733. A second groove 735 is formed between the second A contact portion 71 and the second middle portion 73. The second groove 735 is adjacent to a bending region (that is, the second turning segment 733*a*) between the fifth section 732 and the sixth section 733. The fourth section 731 and the sixth section 733 are connected to a same side of the fifth section 732. The two second B contact arms 721 and the two second pins 741 are respectively located on two opposite sides of the fourth section 731.

FIG. 1 shows that the first electrical terminal 6 and the second electrical terminal 7 are combined into the electrical terminal assembly T1. The first electrical terminal 6 and the second electrical terminal 7 are arranged side by side along the Y-axis direction, and the first electrical terminal 6 and the second electrical terminal 7 are not in contact with each other (with no physical contact). The second notch 730 and the first notch 630 are arranged side by side to form a limiting groove G. The electrical terminal assembly T1 may be fixed inside a first electrical connector 1 (referring to FIG. 13 first) through the design of the limiting groove G, the first positioning member 634, and the second positioning member 734. In addition, the first section 631 and the fourth section 731 are substantially higher than the first A contact portion 61 and the second A contact portion 71 in the positive Z-axis direction (the second direction). Therefore, the first middle portion 63 and the second middle portion 73 are more securely fixed inside the first electrical connector 1 by forming a positioning surface (along the XZ plane) on the first section 631 and the fourth section 731. In addition, the first positioning member 634 and the second positioning member 734 protrude more toward an outer side of the electrical terminal assembly (that is, toward the positive and negative Y-axis directions) than the second middle portion 73 and the first middle portion 63. That is, if a central plane (not shown in the figure) between the first section 631 and the fourth section 731 is defined on the XZ plane, on the positive Y-axis, a distance between an outermost end of the first positioning member 634 and the central plane is greater than a distance between an outermost end of the second middle portion 73 and the central plane; on the negative Y-axis, a distance between an outermost end of the second positioning member 734 and the central plane is greater than a distance between an outermost end of the first middle portion 63 and the central plane, so that the first positioning member 634 and the second positioning member 734 can provide additional positioning functions. Further, the two first A contact arms 611 of the first A contact portion 61 and the two second A contact arms 711 of the second A contact portion 71 are arranged in a slot H1 (Referring to FIG. 13) and opposite to each other in an up-and-down direction (in the Z-axis direction) to form a first port U1, for providing a mating surface parallel to an XY plane. The two first B contact arms 621 of the first B contact portion 62 and the two second B contact arms 721 of the second B contact portion 72 are arranged opposite to each other to provide a B contact portion that is in a shunt slot H2 (referring to FIG. 13) and form a second port U2, for providing a mating surface parallel to the YZ plane. Therefore, the first main body region of the first middle portion 63 and the second main body region of the second middle portion 73 are perpendicular to the mating surface of the first port U1, and are also perpendicular to the mating surface of the second port U2. The first port U1 may be used for an external electrical connector (or a power supply unit (PSU)) to be plugged in along the negative X-axis direction (that is, parallel to a direction of arrangement of the two first pins 641 and the two second pins 741). The external electrical connector (or the PSU) is plugged into the first port U1 to be in physical contact with the contact regions 611A of the first A contact arms 611 and the contact regions 711A of the second A contact arms 711. The second port U2 may be used for a second electrical connector 3 (referring to FIG. 13 again) to be plugged in along the negative Z-axis direction. The second electrical connector 3 is plugged into the second port U2 to be in physical contact with the contact regions 621A of the first B contact arm 621 and the contact regions 721A of the second B contact arm 721. The two first pins 641 of the first pin portion 64 and the two second pins 741 of the second pin portion 74 may be used for being plugged into an external circuit board. Among the contact regions 611A of the two first A contact arms 611 and the contact regions 711A of the two second A contact arms 711, a contact region distance between the contact regions 611A and 711A on a same side (one pair) is smaller than a contact region distance between the contact regions 611A and 711A on another same side (another pair). In other words, a contact region distance is defined between each first A contact pin 611 and a corresponding second A contact pin 711, and at least two adjacent ones of the contact region distance are different, so that an insertion force required for the external electrical connector (or the PSU) to perform mating can be reduced.

Second Embodiment

Figure 4:
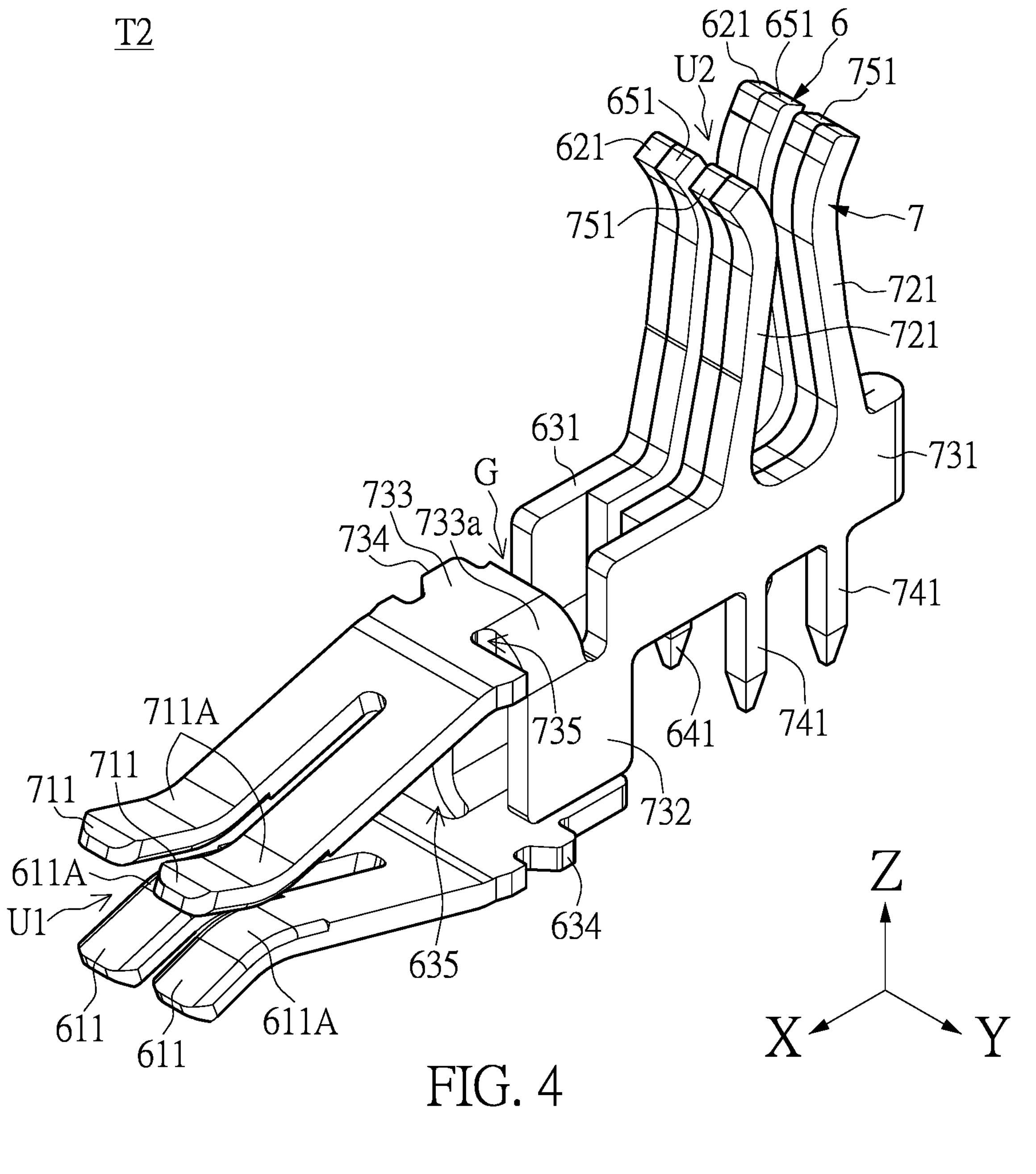
FIG. 4 is a three-dimensional schematic view of an electrical terminal assembly according to a second embodiment of the present disclosure.
Figure 5:
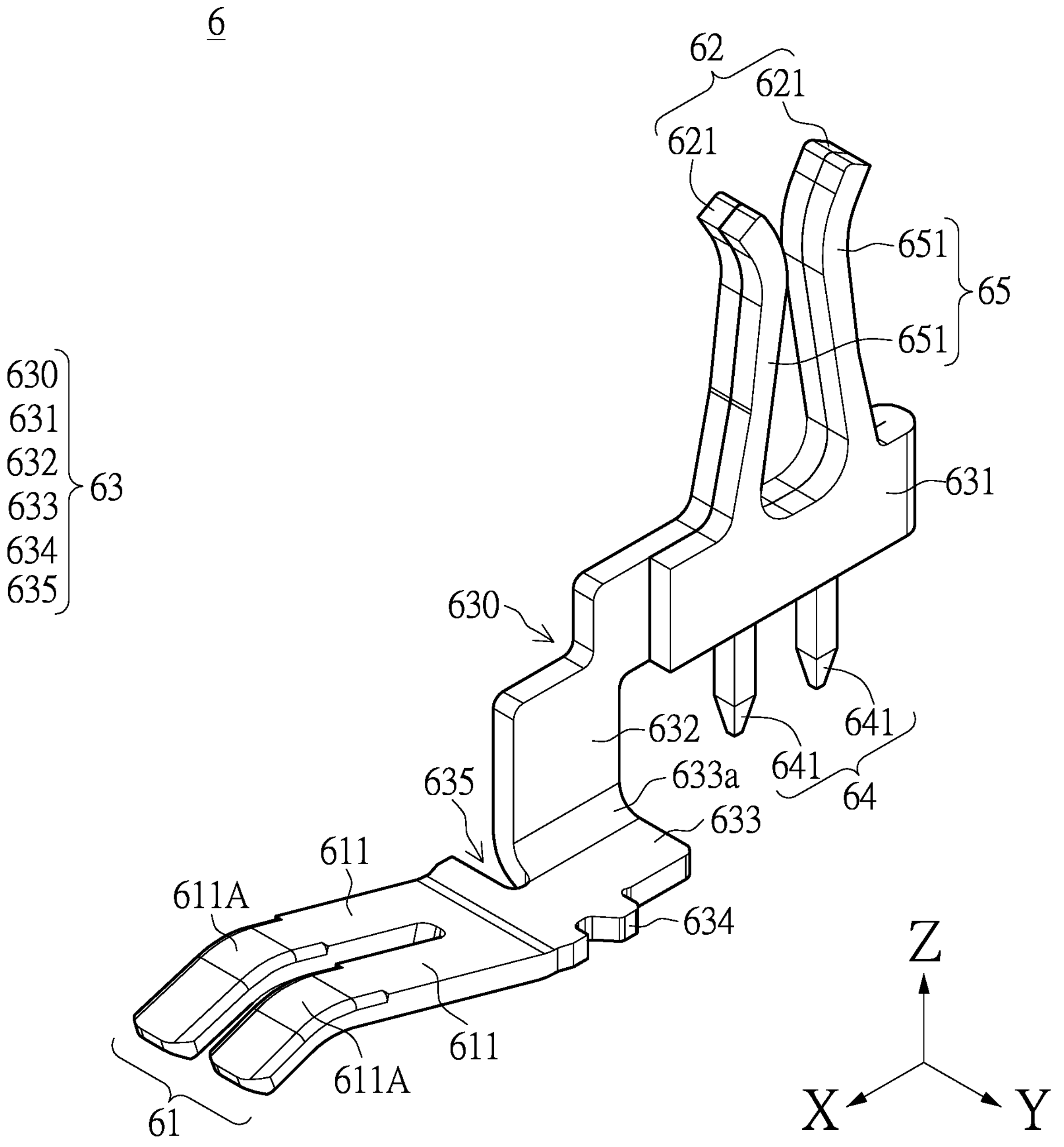
FIG. 5 is a three-dimensional schematic view of a first electrical terminal according to the second embodiment of the present disclosure.
Figure 6:
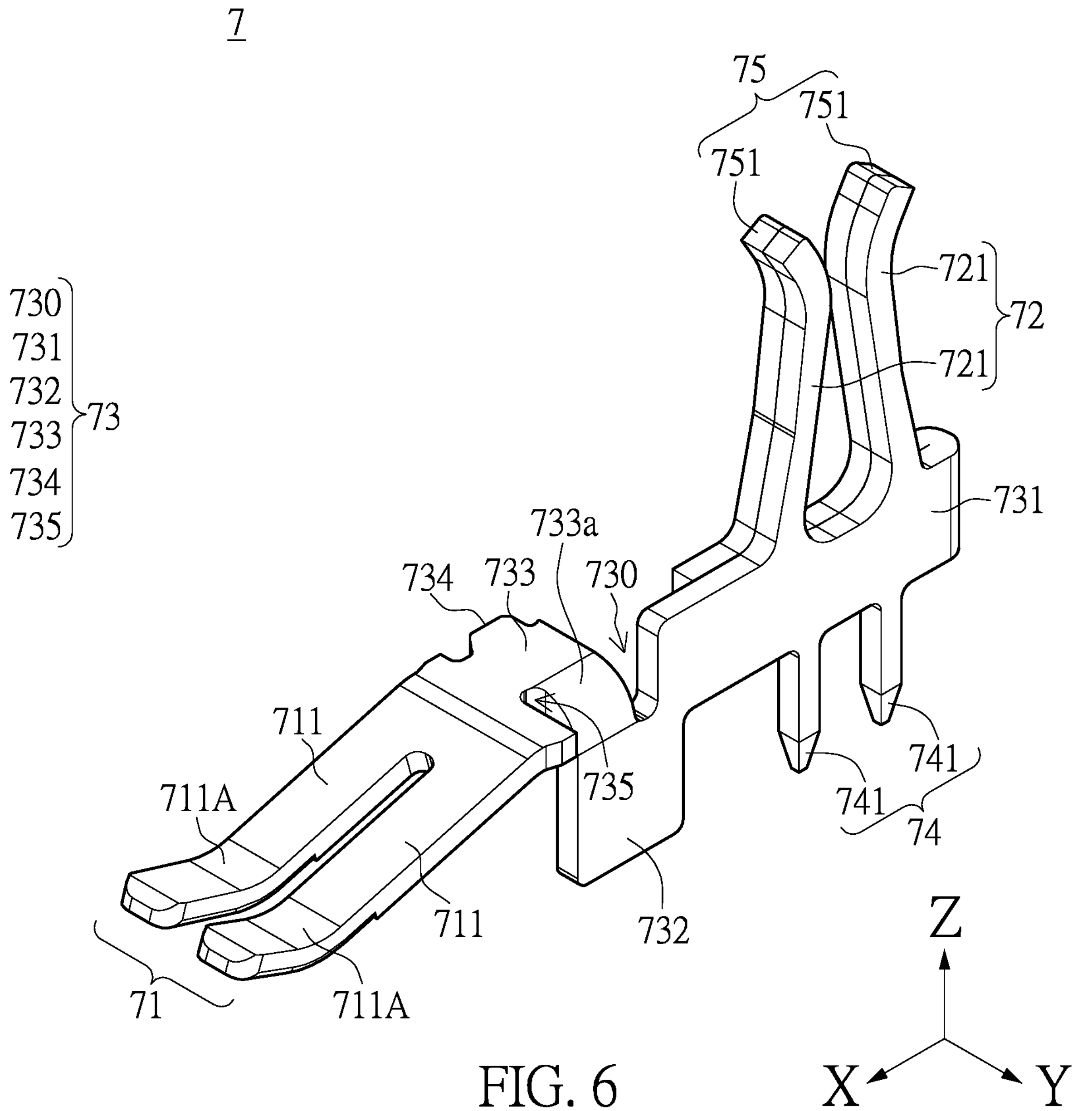
FIG. 6 is a three-dimensional schematic view of a second electrical terminal according to the second embodiment of the present disclosure.

Referring to FIG. 4, FIG. 5, and FIG. 6, the second embodiment of the present disclosure provides an electrical terminal assembly T2, which includes a first electrical terminal 6 and a second electrical terminal 7. The first electrical terminal 6 of the electrical terminal assembly T2 has a similar structure to the first electrical terminal 6 of the electrical terminal assembly T1, and the second electrical terminal 7 of the electrical terminal assembly T2 has a similar structure to the second electrical terminal 7 of the electrical terminal assembly T1. The similarities thereof are not described again.

As shown in FIG. 5, a difference between the first electrical terminal 6 of the electrical terminal assembly T2 and the first electrical terminal 6 of the electrical terminal assembly T1 lies in that the first electrical terminal 6 of the electrical terminal assembly T2 further includes a third B contact portion 65. Moreover, the first section 631 of the first middle portion 63 extends longer to form an elongated segment, and the third B contact portion 65 is connected to the elongated segment of the first section 631 and extends along the second direction (the positive Z-axis direction). Specifically, the third B contact portion includes two third B contact arms 651 that are mirror symmetrical or substantially mirror symmetrical in shape on the two opposite sides of the YZ plane, and the first section 631 is folded (or in other words, the elongated segment of the first section 631 is bent toward the positive X-axis direction), so that the two first B contact arms 621 respectively overlap the two third B contact arms 651.

As shown in FIG. 6, the second electrical terminal 7 of the electrical terminal assembly T2 further includes a fourth B contact portion 75, the fourth section 731 of the second middle portion 73 extends longer, and the fourth B contact portion 75 is connected to an elongated segment of the fourth section 731 and extends along the second direction (the positive Z-axis direction). The fourth B contact portion 75 includes two fourth B contact arms 751 that are mirror symmetrical or substantially mirror symmetrical in shape on the two opposite sides of the YZ plane, and the fourth section 731 is folded (or in other words, the elongated segment of the fourth section 731 extends toward the positive X-axis direction), so that the two second B contact arms 721 respectively overlap the two fourth B contact arms 751. Referring to FIG. 4, the two first B contact arms 621 and the two third B contact arms 651 of the first B contact portion 62 are arranged opposite to the two second B contact arms 721 and the two fourth B contact arms 751 of the second B contact portion 72 and jointly form a second port U2, for providing a mating surface along the YZ plane. In the present disclosure, through the design of the two third B contact arms 651 and the two fourth B contact arms 751, a maximum current that the electrical terminal assembly can provide through the second port U2 is increased by increasing a contact area between the second port U2 and the second electrical connector 3.

Third Embodiment

Figure 7:
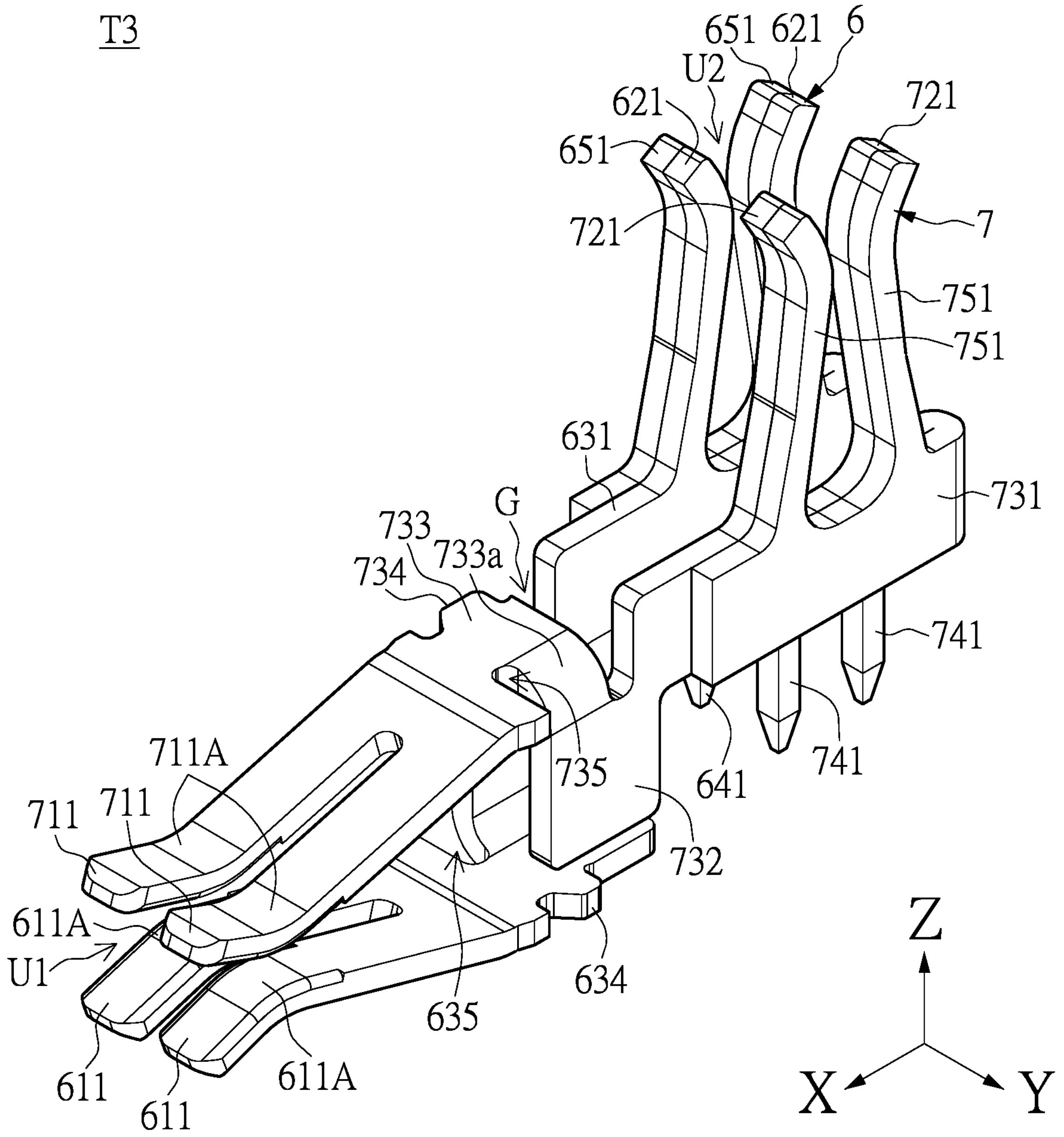
FIG. 7 is a three-dimensional schematic view of an electrical terminal assembly according to a third embodiment of the present disclosure.
Figure 8:
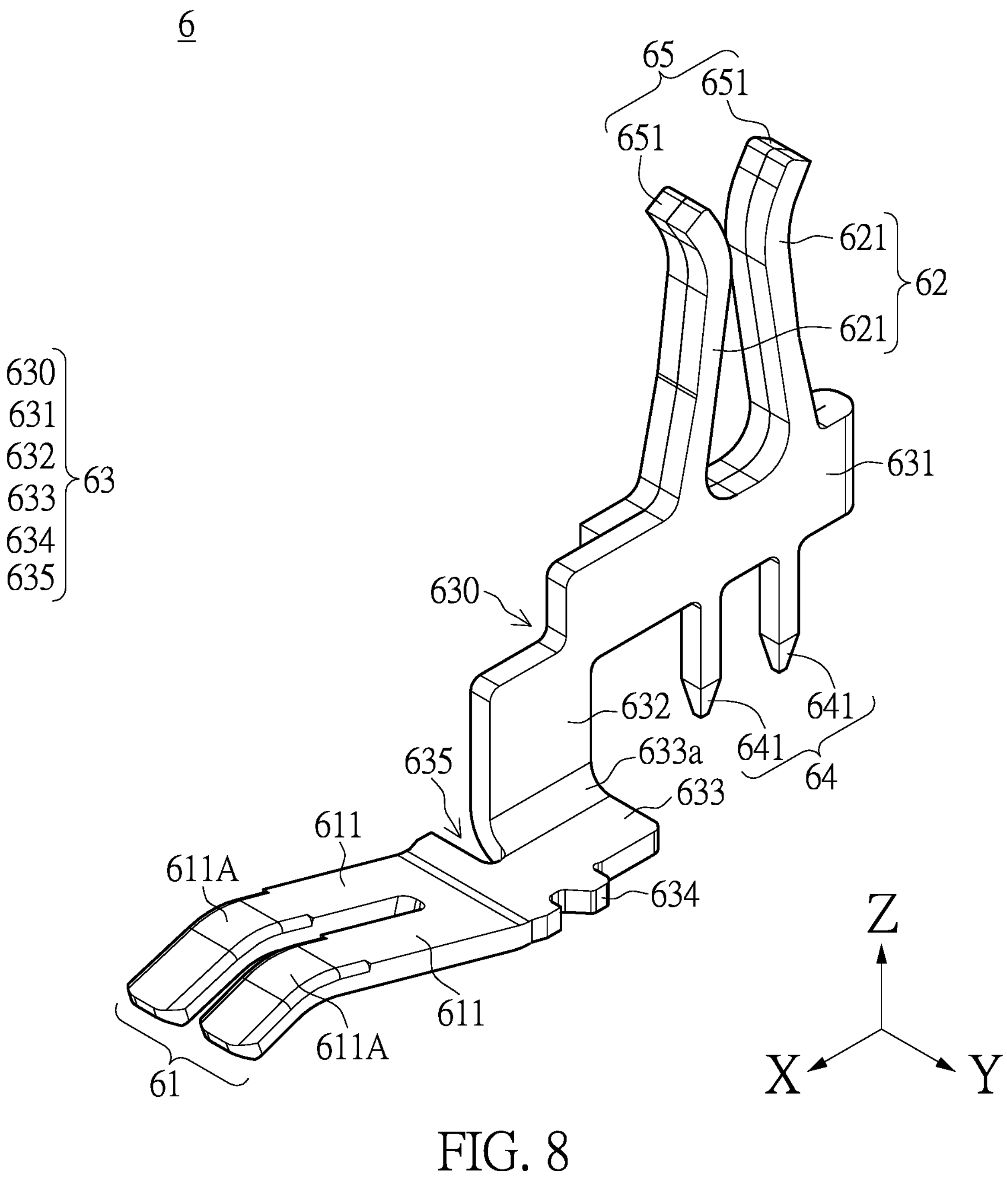
FIG. 8 is a three-dimensional schematic view of a first electrical terminal according to the third embodiment of the present disclosure.
Figure 9:
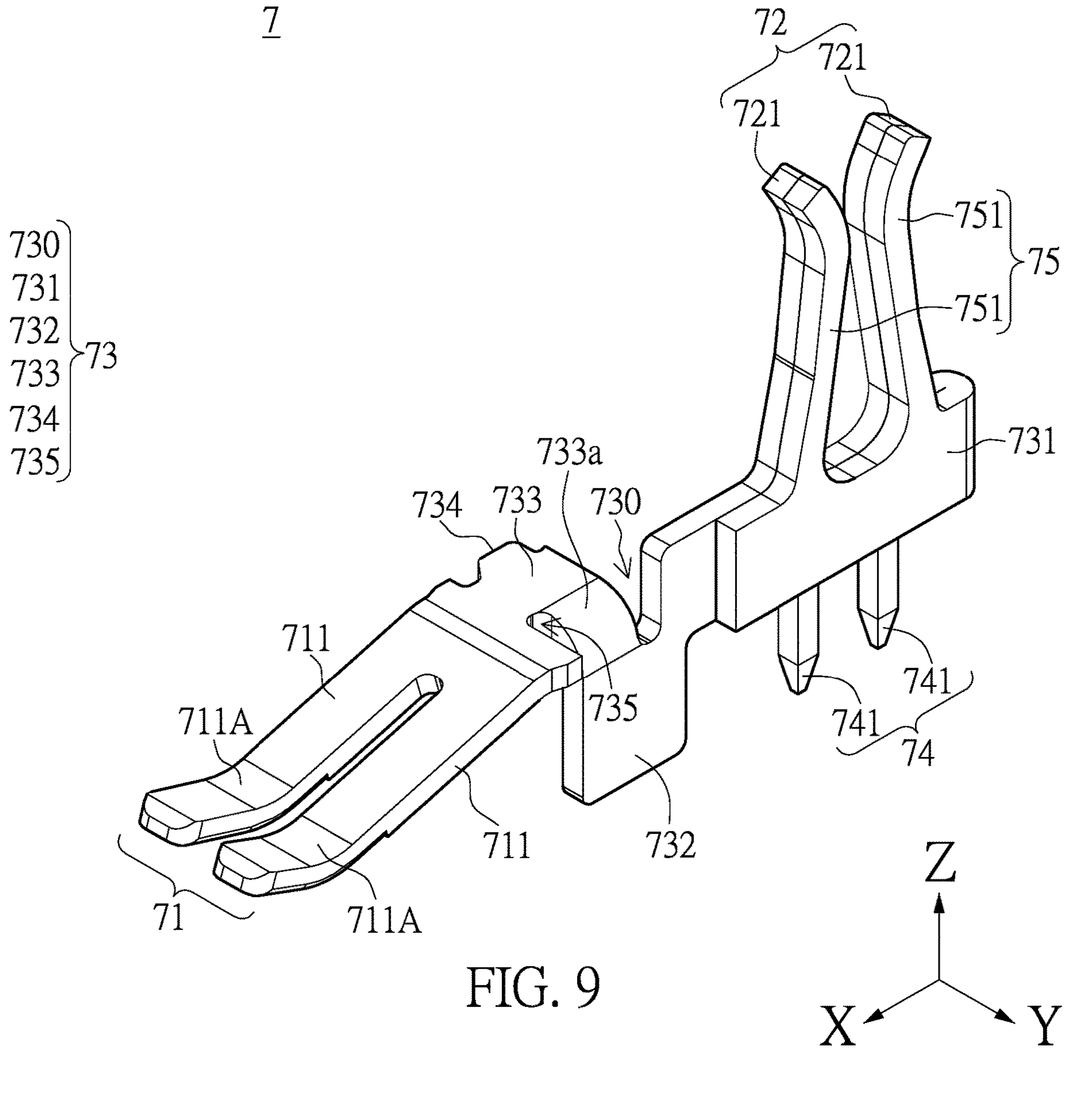
FIG. 9 is a three-dimensional schematic view of a second electrical terminal according to the third embodiment of the present disclosure.

Referring to FIG. 7, FIG. 8, and FIG. 9, the third embodiment of the present disclosure provides an electrical terminal assembly T3, which includes a first electrical terminal 6 and a second electrical terminal 7. The first electrical terminal 6 of the electrical terminal assembly T3 has a similar structure to the first electrical terminal 6 of the electrical terminal assembly T2, and the second electrical terminal 7 of the electrical terminal assembly T3 has a similar structure to the second electrical terminal 7 of the electrical terminal assembly T2. The similarities thereof are not described again.

As can be observed from a comparison of FIG. 7 and FIG. 4, in the electrical terminal assembly T2, the first section 631 of the first middle portion 63 of the first electrical terminal 6 and the fourth section 731 of the second middle portion 73 of the second electrical terminal 7 are bent toward an inner side of the electrical terminal assembly T2 (or in other words, the first section 631 and the fourth section 731 are folded toward a direction facing each other). Conversely, in the electrical terminal assembly T3, the first section 631 of the first middle portion 63 of the first electrical terminal 6 and the fourth section 731 of the second middle portion 73 of the second electrical terminal 7 are bent toward an outer side of the electrical terminal assembly T3 (or in other words, the first section 631 and the fourth section 731 are bent toward a direction facing away from each other).

It should be noted that, the foregoing disclosures concerning the second and third embodiments are only two possible embodiments and are not intended to limit the present disclosure. In other embodiments, the first section 631 of the first middle portion 63 of the first electrical terminal 6 and the fourth section 731 of the second middle portion 73 of the second electrical terminal 7 can also be bent toward a same direction, such as being bent toward the positive Y-axis direction (e.g., an electrical terminal assembly T2' in FIG. 13), or being bent toward the negative Y-axis direction (e.g., an electrical terminal assembly T3' in FIG. 13). In addition, the first section 631 and the second section 731 may also be folded two or more times, and more B contact arms overlap each other to form the second port U2, so as to provide a larger current.

Fourth Embodiment

Figure 10:
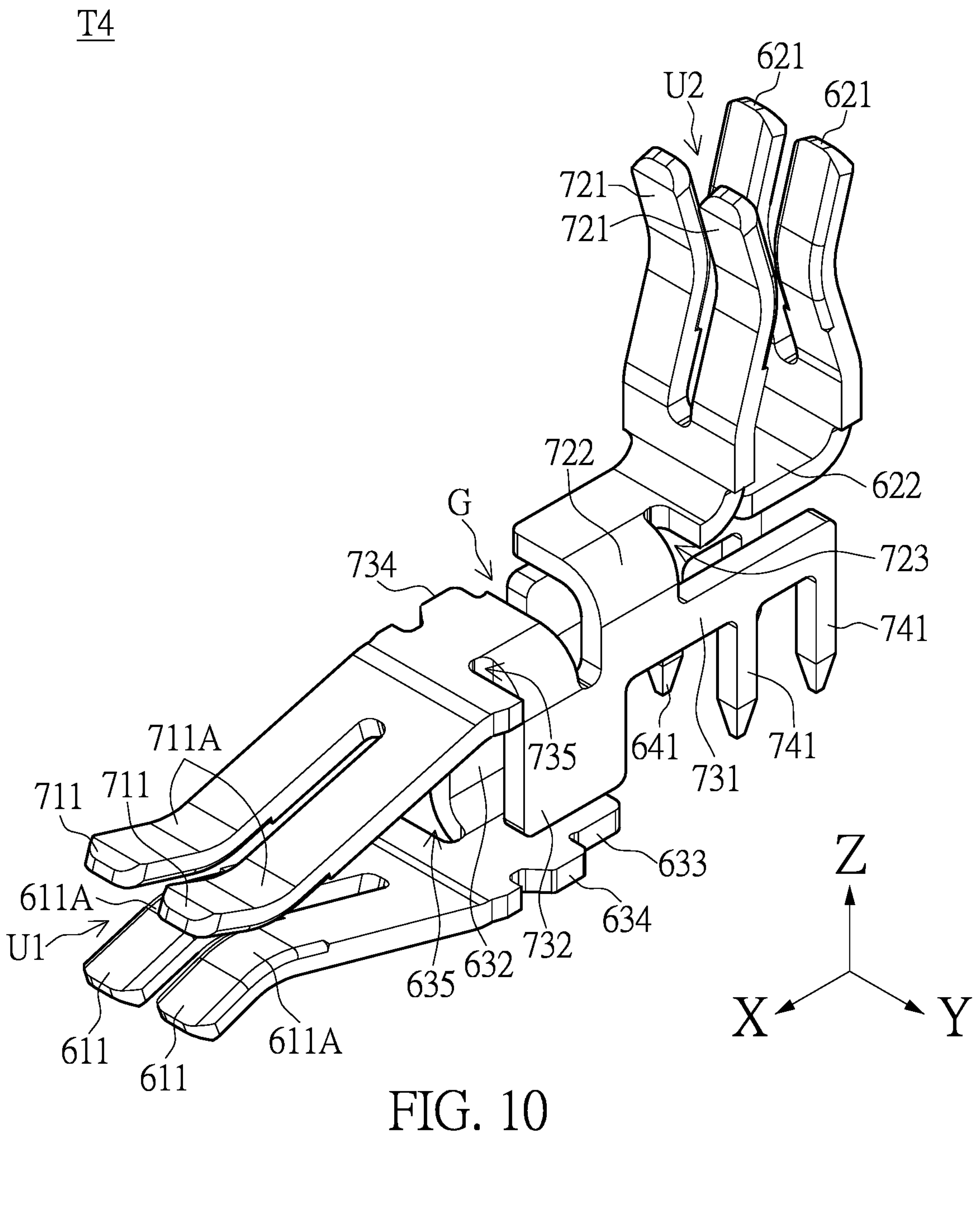
FIG. 10 is a three-dimensional schematic view of an electrical terminal assembly according to a fourth embodiment of the present disclosure.
Figure 11:
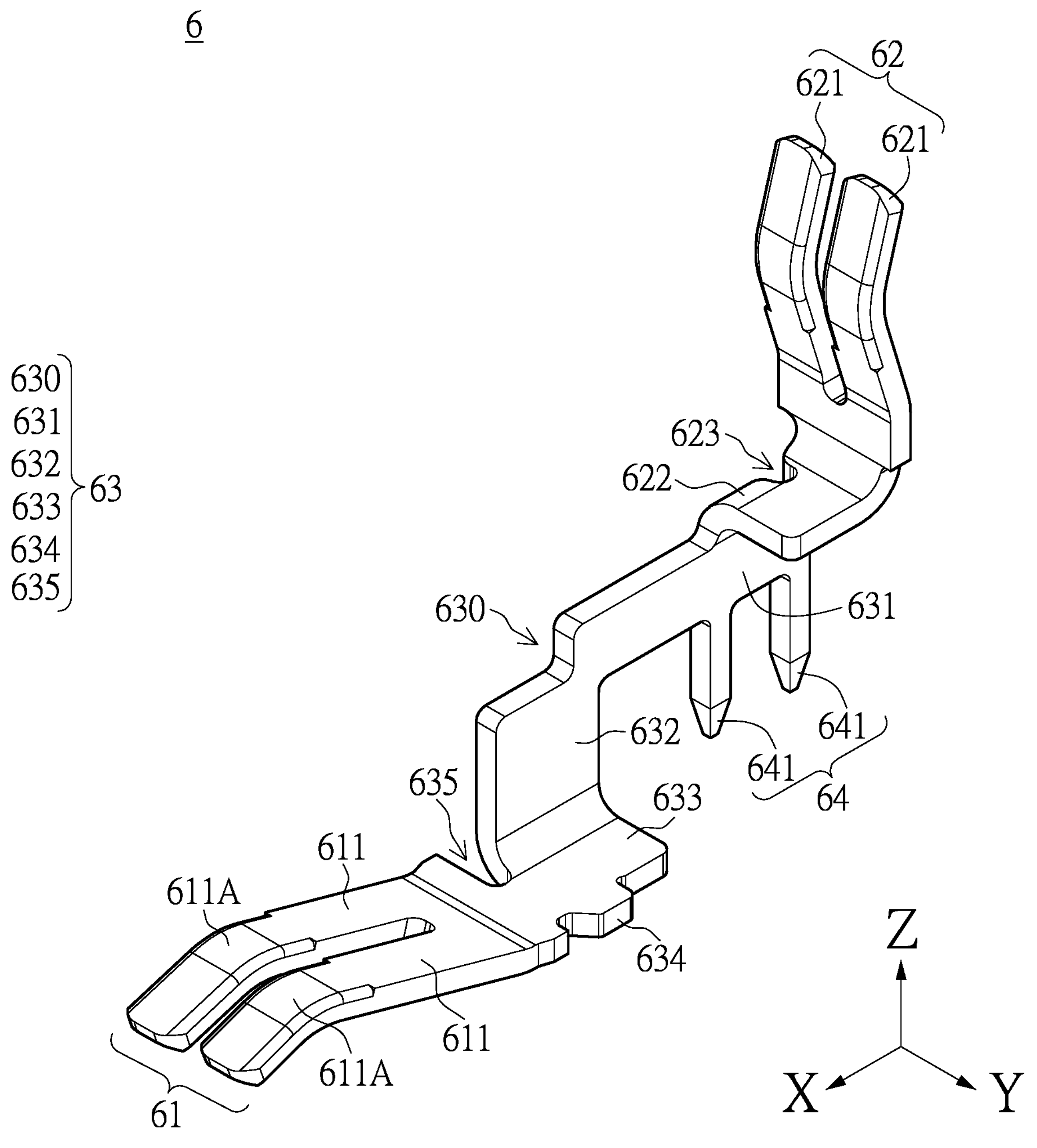
FIG. 11 is a three-dimensional schematic view of a first electrical terminal according to the fourth embodiment of the present disclosure.
Figure 12:
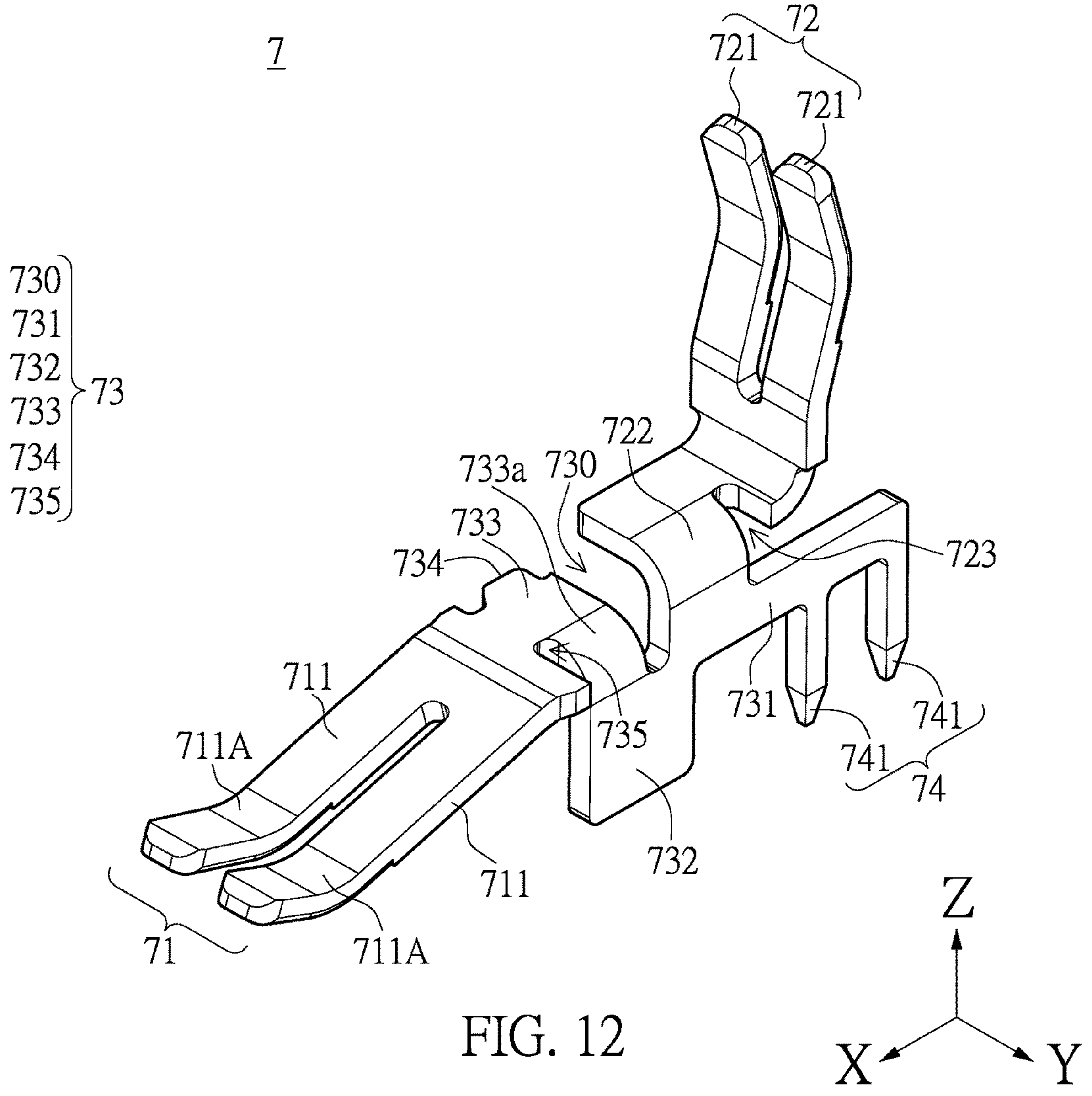
FIG. 12 is a three-dimensional schematic view of a second electrical terminal according to the fourth embodiment of the present disclosure.

Referring to FIG. 10 to FIG. 12, the fourth embodiment of the present disclosure provides an electrical terminal assembly T4, which includes a first electrical terminal 6 and a second electrical terminal 7. The first electrical terminal 6 of the electrical terminal assembly T4 has a similar structure to the first electrical terminal 6 of the electrical terminal assembly T1, and the second electrical terminal 7 of the electrical terminal assembly T4 has a similar structure to the second electrical terminal 7 of the electrical terminal assembly T1. The similarities thereof are not described again.

As shown in FIG. 11, a difference between the first electrical terminal 6 of the electrical terminal assembly T4 and the first electrical terminal 6 of the electrical terminal assembly T1 lies in that the first B contact portion 62 of the first electrical terminal 6 of the electrical terminal assembly T4 further includes a first bending segment 622, and the first bending segment 622 is connected between the first section 631 of the first middle portion 63 and the two first B contact arms 621 of the first B contact portion 12. The first bending segment 622 is bent toward the positive Y-axis direction with respect to the first section 631 of the first extension portion 63, and the two first B contact arms 621 are bent toward the positive Z-axis direction with respect to the first bending segment 622. In addition, a third groove 623 is located between the first bending segment 622 and the two first B contact arms 621 and adjacent to the first bending segment 622.

As shown in FIG. 12, a difference between the second electrical terminal 7 of the electrical terminal assembly T4 and the second electrical terminal 7 of the electrical terminal assembly T1 lies in that the second B contact portion 72 of the second electrical terminal 7 of the electrical terminal assembly T4 further includes a second bending segment 722, and the second bending segment 722 is connected between the fourth section 731 of the second middle portion 73 and the two second B contact arms 721 of the second B contact portion 72. The second bending segment 722 is bent toward the negative Y-axis direction with respect to the fourth section 731, and the two second B contact arms 721 are bent toward the positive Z-axis direction with respect to the second bending segment 722. In addition, a fourth groove 723 is formed between the second bending segment 722 and the two second B contact arms 721, and the fourth groove 723 is adjacent to the second bending segment 722.

Further, as shown in FIG. 10, when the first electrical terminal 6 and the second electrical terminal 7 form the electrical terminal assembly T4, the second B contact portion 72 and the first B contact portion 71 are arranged side by side along the first direction (the positive X-axis direction) and form a second port U2, for providing a mating surface parallel to the YZ plane. In addition, due to the design of the first bending segment 622 and the second bending segment 722, the two first B contact arms 621 and the two second B contact arms 721 in this embodiment are arranged along the Y-axis (in contrast, the two first B contact arms 621 and the two second B contact arms 721 in the electrical terminal assembly T1 are arranged along the X-axis) and are mirror symmetrical.

Figure 13:
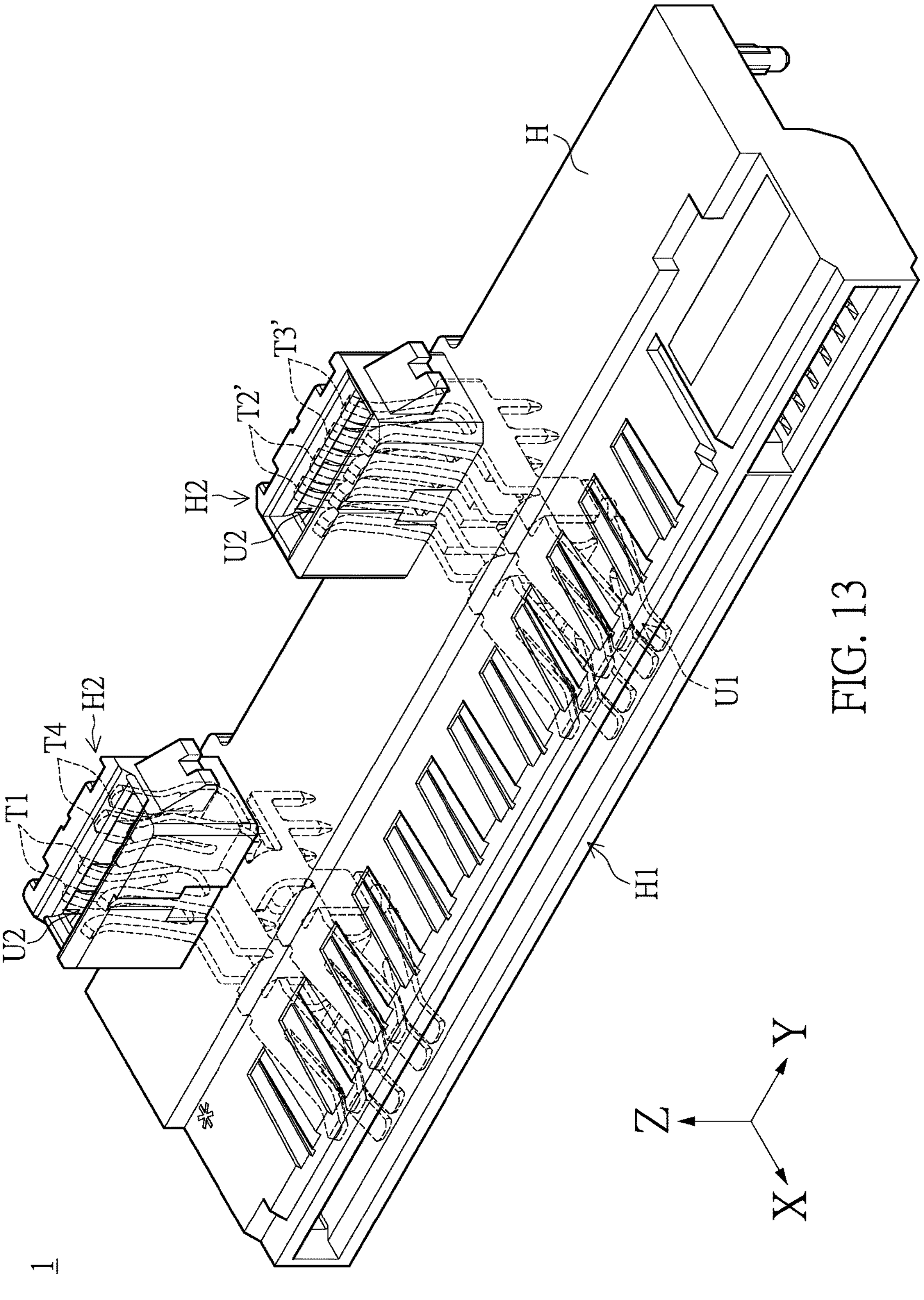
FIG. 13 is a three-dimensional schematic view of an electrical connector according to the present disclosure.
Figure 14:
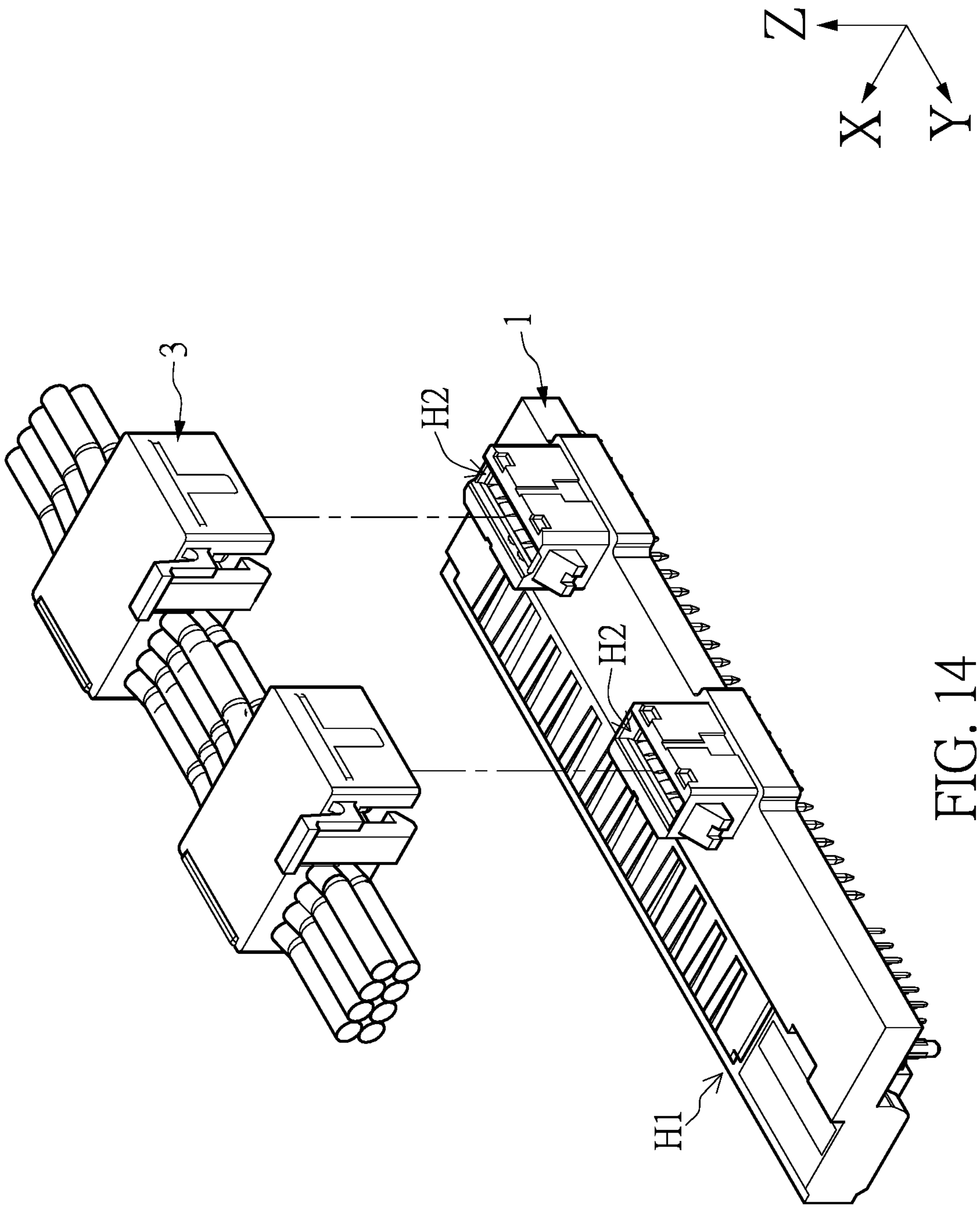
FIG. 14 is a schematic exploded view of an electrical connector, a matching component, and a second electrical connector according to the present disclosure.
Figure 15:
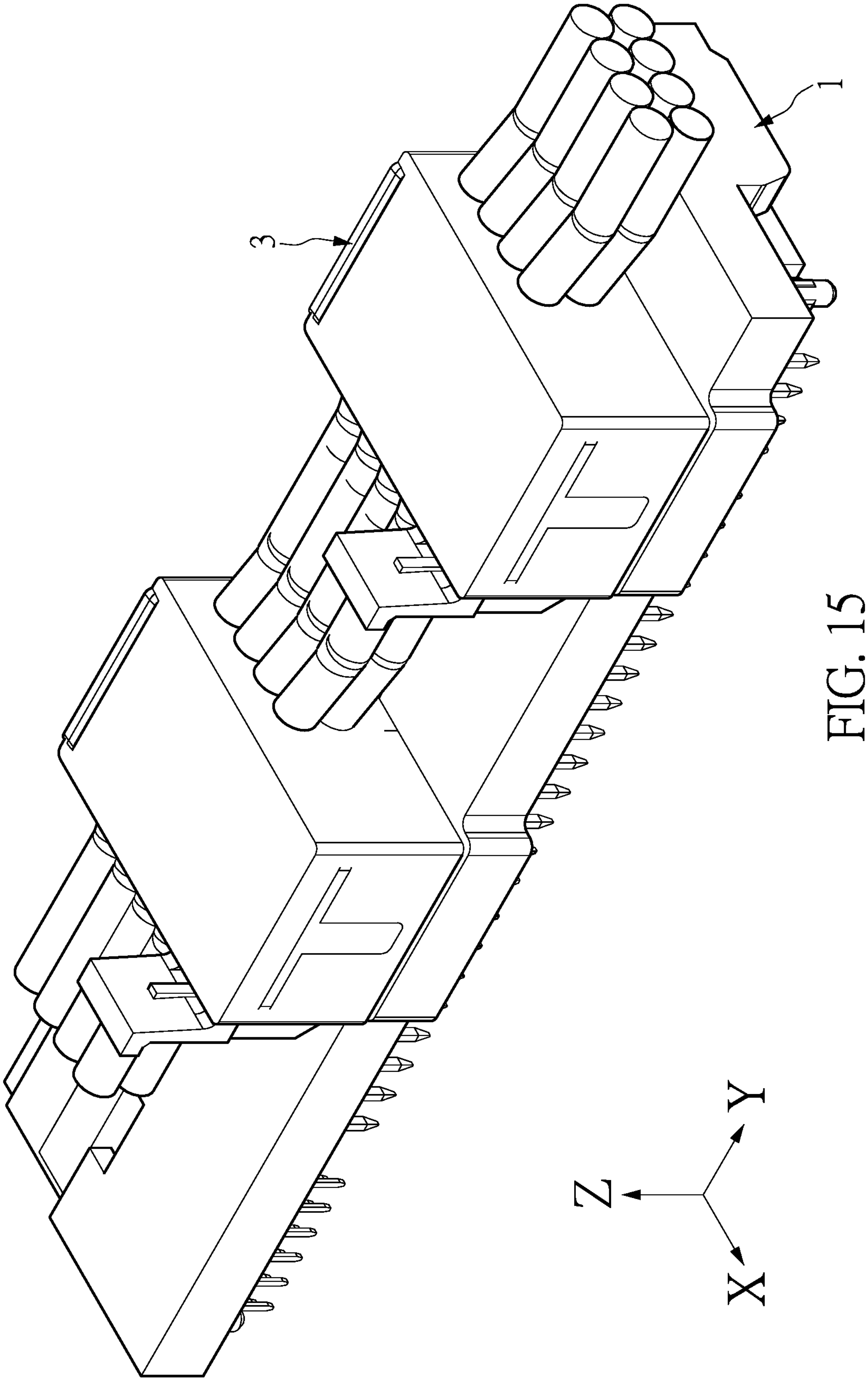
FIG. 15 is a schematic diagram of an electrical connector being connected to a matching component and a second electrical connector according to the present disclosure.

Subsequently, referring to FIG. 13 to FIG. 15, the present disclosure provides the first electrical connector 1, which includes an insulating housing H and a plurality of electrical terminal assemblies. Any one of the plurality of electrical terminal assemblies can be the electrical terminal assembly T1, T2, T3, or T4 (or T2' and T3') in the foregoing first to fourth embodiments. The insulating housing H has a slot H1 on a front side surface that is rectangular in shape and at least one adaptor socket on a top side surface. Each of the adaptor sockets is rectangular in shape, and has two lateral walls and two limiting side walls that define at least one shunt slot H2 therein. A length direction of the first side surface is parallel to a circuit board P (Referring to FIG. 24). The slot H1 faces the first direction (positive X-axis direction) and corresponds to the first port U1; that is, the slot H1 communicates with the first port U1. The shunt slot H2 faces the second direction (positive Z-axis direction) and corresponds to the second port U2; that is, the shunt slot H2 communicates with and is parallel to the second port U2.

In continuation of the above, both the slot H1 and the shunt slot H2 are used as plug-in input interfaces for electrical connection of a mating component. For example, the slot H1 may be a card edge or a plug-in input interface of a power-supply board, for allowing a matching component (not shown in the figure) to be plugged in along a plug-in direction (negative X-axis). The matching component can be a matching connector or an output end of a power supplier, such as a card edge interface of an output end of a power supplier adopting the CRPS (common redundant power supply). In other words, the slot 11 is a plug input interface of a card edge, a power board, or a busbar. The matching component is inserted into the slot H1 and then is further plugged into the first port U1, so as to be electrically connected to the electrical terminal assembly (T1 to T4). In addition, for example, each shunt slot H2 may be used for a second electrical connector 3 to be plugged in (therefore, multiple ones of shunt slot H2 may be used for multiple ones of the second electrical connector 3 to be plugged in). The second electrical connector 3 may be, for example, an external electrical connector with a cable or a bus bar. The second electrical connector 3 is inserted into the slot H1, and then is further plugged into the second port U2, so as to be electrically connected to the electrical terminal assembly (T1 to T4). In addition, the first pin portion 64 and the second pin portion 74 are used for being plugged into a circuit board (not shown in the figure). As described in the foregoing embodiment, each electrical terminal assembly provides a plurality of pins that are arranged along the X-axis and are parallel with a plug-in direction of the first port U1.

Therefore, the first electrical connector 1 of the present disclosure is actually a shunt connector, which can transmit, to a plurality of second electrical connector 3 through a plurality of electrical terminal assemblies, a power supply (or a signal) provided by the matching component (such as a PSU), so as to shunt a current or transfer the signal.

Fifth Embodiment

Figure 16:
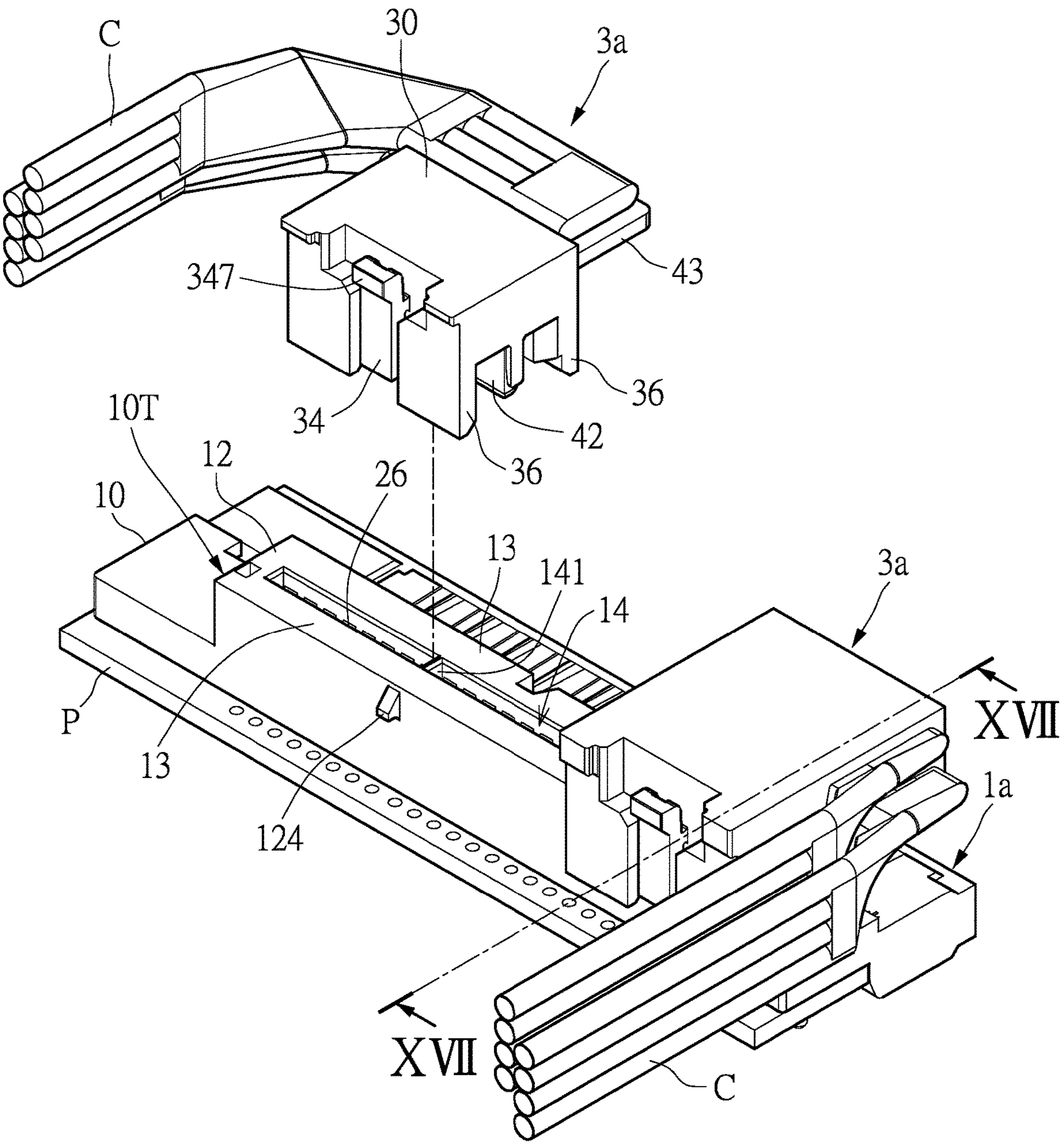
FIG. 16 is a perspective view showing the connector assembly having the shunt structure being partially assembled according to a fifth embodiment of the present disclosure.
Figure 17:
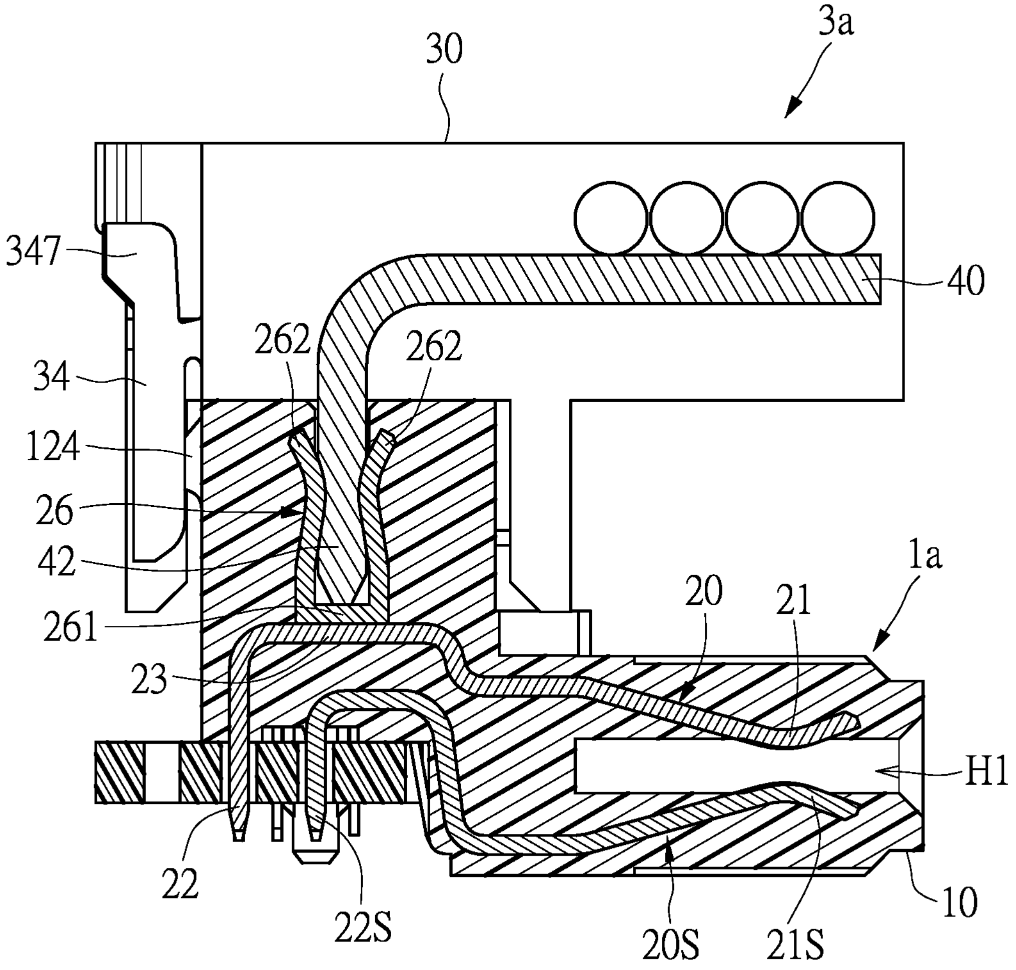
FIG. 17 is a sectional view taken along line XVII-XVII of FIG. 16 according to the present disclosure.

Referring to FIG. 16 and FIG. 17, a fifth embodiment of the present disclosure provides a connector assembly having a shunt structure, which includes a first connector 1*a* and at least one second connector 3*a*. The first connector 1*a* includes the first insulating housing 10 and a plurality of electrical terminals in pairs, and at least one adapter socket 10T. Each pair of the electrical terminals has an A contact portion, a B contact portion, a middle portion and a pin portion. In the present embodiment, the electrical terminals are divided into a plurality of first electrical terminals 20 and a plurality of second electrical terminals 20S that are arranged in pairs. This embodiment uses two second connectors 3*a* as an example. Each of two second connectors 3*a* includes the second insulating housing 30. The bottom view of the second insulating housing 30 is rectangular in shape. The first insulating housing 10 has a first side surface and a second side surface. The first side surface has a plug side that provides a slot H1, so as to be electrically connected to a matching component (e.g. a power supply component). The second side surface has an output interface, which is used to output electric current and/or signals provided by the matching component. The first connector 1*a* may be called a connector having a shunt structure. In addition, the second connector 3*a* may be called a shunt device. The shunt device is mated with the adapter socket, so as to shunt electric current of the connector.

In the present embodiment, the first insulating housing 10 further has a top surface and a bottom surface opposite to the top surface. The first connector 1*a* is connected to a circuit board P. The input interface is a slot H1, and the output interface is located at the bottom surface. The slot H1 is communicated with the plug side and the bottom surface. The slot H1 allows the matching component (not shown in the figures) to insert along a plug-in direction. The slot H1 can function as a power input interface and/or a signal input interface. Or, a plurality of the slots H1 may respectively function as the power input interface or the signal input interface. Each of the first electrical terminals 20 has a first A contact portion 21, each of the second electrical terminals 20S has a second A contact portion 21S. The first A contact portion 21 and the second A contact portion 21S extend into the slot H1 (i.e., the plug input interface), and a first pin portion 22 and a second pin portion 22S extend to the bottom surface of the first insulating housing 10 (i.e., the output interface). The first A contact portion 21 and the first pin portion 22 are electrically connected to each other, and the second A contact portion 21S and the second pin portion 22S are electrically connected to each other. In the present embodiment, the bottom surface of the first insulating housing 10 functions as a power output interface and/or a signal output interface.

In the present embodiment, the first A contact portions 21 of the first electrical terminals 20 and the second A contact portions 21S of the second electrical terminals 20S are located at the input interface. Referring to FIG. 17, the second electrical terminals 20S are provided below the first electrical terminals 20. The first electrical terminals 20 and the second electrical terminals that are arranged in pairs each have a first A contact portion 21 and a second A contact portion 21S, which jointly form one planar contact area and define a slot therebetween, which is electrically connected to the matching component when the matching component is inserted thereinto. For example, the first A contact portions 21 and the second A contact portions 21S jointly form one planar contact surface that is parallel to the circuit board P (that is, the planar contact surface is parallel to the plug-in direction. Alternatively, the first A contact portions 21 and the second A contact portions 21S in pair respectively form a plurality of the planar contact surfaces that are perpendicular to the circuit board P. The first A contact portions 21 and the second A contact portions 21S are electrically connected to a power potential or a ground potential of the matching component. Such a configuration allows for insertion of the matching component, e.g., terminals of a plug connector, a power board, or a busbar. That is, the matching component has a plate-like terminal or a plurality of terminals arranged on the same plane, or has a plurality of terminals each having at least one planar contact surface, so as to be mated with the input surface of the connector assembly of the present disclosure. The input interface may have one or more slots that are parallel to the circuit board P, or can be multiple slots that are perpendicular to the circuit board P. In applications where high power is required, thickness of the first A electrical terminal 20 and the second electrical terminal 20S (i.e., a thickness that is perpendicular to a direction of the slot) are greater than or equal to 0.3 mm, and preferably greater than or equal to 0.6 mm. To prevent excessive insertion force, the thickness of the first A electrical terminal 20 and the second electrical terminal 20S are less than or equal to 2 mm, and preferably less than or equal to 1 mm. In this way, the first A electrical terminal 20 and the second electrical terminal 20S are much improved and have a balance between the normal force when being combined with the matching component and the ability to provide the electric current. In addition, each of the first A contact portion 21 of the first electrical terminal 20 and each of the second A contact portion 21S of second electrical terminal 20S can include a plurality of elastic arms, so as to prevent any excessive insertion force. In addition, in an application where there is only one slot, significant differences between insertion forces at two ends of the contact surface of the slot which are caused by slanting of the planar contact surface due to assembly tolerance can be prevented.

The first pin portion 22 of the first electrical terminal 20 and the second pin portion 22S of the second electrical terminal 20S extend out of the second side surface, and form one output interface that is connected to the circuit board P. The method of connection can be welding or press fit. Therefore, the first pin portion 22 and the second pin portion 22S can be welding pins or press-fit pins. When the first pin portion 22 and the second pin portion 22S are welding pins, the first pin portion 22 and the second pin portion 22S are connected to the circuit board P by through-hole welding and/or surface mount technology. The first connector 1*a* can be connected to the circuit board P in a vertical manner or a right-angle manner. That is, the first pin portion 22 and the second pin portion 22S can have 90-degree bent portions or can be in a linear shape. When the first pin portion 22 and the second pin portion 22S are in a linear shape (not shown in the figures), the second side surface and the first side surface are oppositely located. At this time, the plug-in direction is perpendicular to a surface of the circuit board P, and insertion of the matching component is along the plug-in direction. When the first pin portion 22 and the second pin portion 22S have 90-degree bent portions (as shown in FIG. 17), the second side surface is located at the bottom surface. The bent portions may be inside the insulating housing 10, so as to protect and support (or fix) the first pin portion 22 and the second pin portion 22S. At this time, the plug-in direction is parallel to the surface of the circuit board P, and insertion of the matching component is along the plug-in direction. In the present embodiment, the first connector 1*a* is connected to the circuit board P in an offset manner as shown in FIG. 17. That is to say, the bottom surface has a first bottom surface area and a second bottom surface area (the second side surface), and the first pin portion 22 and the second pin portion 22S extend outward from the second bottom surface area. A distance between the second bottom surface area and the top surface is preferably less than a distance between the first bottom surface area and the top surface, so as to reduce an overall height of the first connector 1*a* being connected to the circuit board P. The top surface may be an even surface, or may be divided into a first top surface area and a second top surface area of different height levels. The first top surface area and the first bottom surface area are oppositely located, and the second top surface area and the second bottom surface area are oppositely located.

The adapter socket 10T has at least one shunt slot and is used as a shunt socket and is located on a third side surface of the first insulating housing so as to allow the second connector 3*a* (or called a shunt connector) to be detachably connected to the first connector 1*a* and allow a second electrical terminal of the second connector 3*a* to be electrically connected to at least some of the first electrical terminals 20 of the first connector 1*a*. The third side surface is preferably a surface on a face different from where the first side surface of the input interface of the first connector 1*a* is on and from where a surface of the second side surface of the output surface is on. For example, the first side surface is a front side surface, the second side surface is a bottom surface, and the third side surface can be a top surface or a rear side surface that is opposite to the front side surface. In the embodiment of FIG. 16, the adapter socket 10T is located on the top surface.

The first adapter socket 10T is provided for insertion of the second connector 3*a*, so as to be electrically connected to at least one of the electrical terminals. The adapter socket 10T has two lateral walls 13, two limiting side walls 12, and at least one exposed area 14 that is rectangular in shape. The two lateral walls 13 and the two limiting side walls 12 are connected and have the exposed area 14 surrounded therein. Each of the exposed areas 14 has a shunt slot, and another end of the shunt slot is in the exposed hole (not shown in the figures) on the top surface of the first insulating housing 10. Two adjacent shunt slots are separated by a separating wall 141. In the present embodiment, the separating wall 141 is connected to the two lateral walls 13, and extends to a top surface of the adapter socket 10T to completely separate the two adjacent shunt slots. The shunt slots are in spatial communication with an input interface and an output interface of the first connector 1*a*. A length direction of the shunt slots is parallel to a direction of the lateral walls 13. A forked contact member 26 is additionally disposed on a top surface of the middle portion 23 of the first electrical terminal 20.

The forked contact member 26 has a level portion 261 and a pair of first and second B contact arms 262. The B contact arms 262 respectively extend upward from two sides of the level portion 261 into the shunt slot through the exposed hole. A plug space within the limiting side walls 12 and the lateral walls 13 is defined by the B contact arms 262, and the plug space is parallel to the two lateral walls 13. The level portion 261 is connected to the middle portion 23 of the first electrical terminal 20. A shunt electrical terminal 40 has a shunt contact portion 42 and a shunt leg 43 that extends from the second contact portion 42. In addition, the shunt contact portion 42 of the shunt electrical terminal 40 of the second connector 3*a* is plate-shaped, and is bent and extends downward. That is, the shunt electrical terminal 40 is L-shaped. The second leg 43 (or called a shunt output interface 302) extends out of a side surface of the second insulating housing 30, so as to be connected to at least one wire cable C. The second insulating housing 30 has two blocking walls 36 additionally formed on two sides (preferably two long sides) of the shunt contact portion 42. The shunt contact portion 42 is parallel to the blocking walls 36, i.e., being parallel to long sides of the bottom of the second insulating housing 30. At least one clamping arm 34 is located on a side (preferably on a long side) of the second connector 3*a* and functions as a positioning portion.

In the present embodiment, during the assembling process, the second connector 3*a* is plugged into the first connector 1*a* from top to bottom, the shunt contact portion 42 located at the bottom of the shunt electrical terminal 40 is inserted into the middle of the forked contact member 26 and is electrically connected to the B contact arms 262, and the blocking walls 36 are located on outer sides of the two lateral walls 13. In the present embodiment, the clamping arm 34 exhibits an elastic arm shape and is formed at the front end surface of the second insulating housing 30 (i.e., the long side of the rectangular second insulating housing 30). At least one clamping portion 124 is protruded from a surface of the first insulating housing 10 (i.e., being located on an outer surface of the lateral wall 13) and may function as mistake-proofing keys, and are different from one another to achieve a mistake-proofing effect by being different in terms of shape, position, or quantity. When the second connector 3*a* is inserted downward to the clamping position, only the correct second connector 3*a* can be inserted into and an end (a lower end) of the clamping arm 34 can be clamped with the clamping portion 124. Since other connectors include incompatible positioning portions (or the positioning member is not mated with the positioning portion), a correct or complete insertion cannot take place and so the mistake-proofing effect is achieved. The operator can press an upper end of the clamping arm 34 to remove the clamped state. In order for the operator to conveniently press the clamping arm 34, a pressing portion 347 is provided on the upper end of the clamping arm 34, and extends and protrudes outward from the clamping arm 34 (i.e., being distant from the second connector 3*a*). That is, the pressing portion 347 protrudes from the front end surface of the second insulating housing 30, which is convenient for the operator to make sure of a pressing point and an application of force when pressing. Furthermore, a location of the second insulating housing 30 that corresponds to the pressing portion 347 can also have a recessed space. The recessed space is formed by the front end surface of the second insulating housing 30 being concaved inward. In this way, when the operator presses the pressing portion 347 toward the second insulating housing 30, a fingertip of the operator can be accommodated.

Sixth Embodiment

Figure 18:
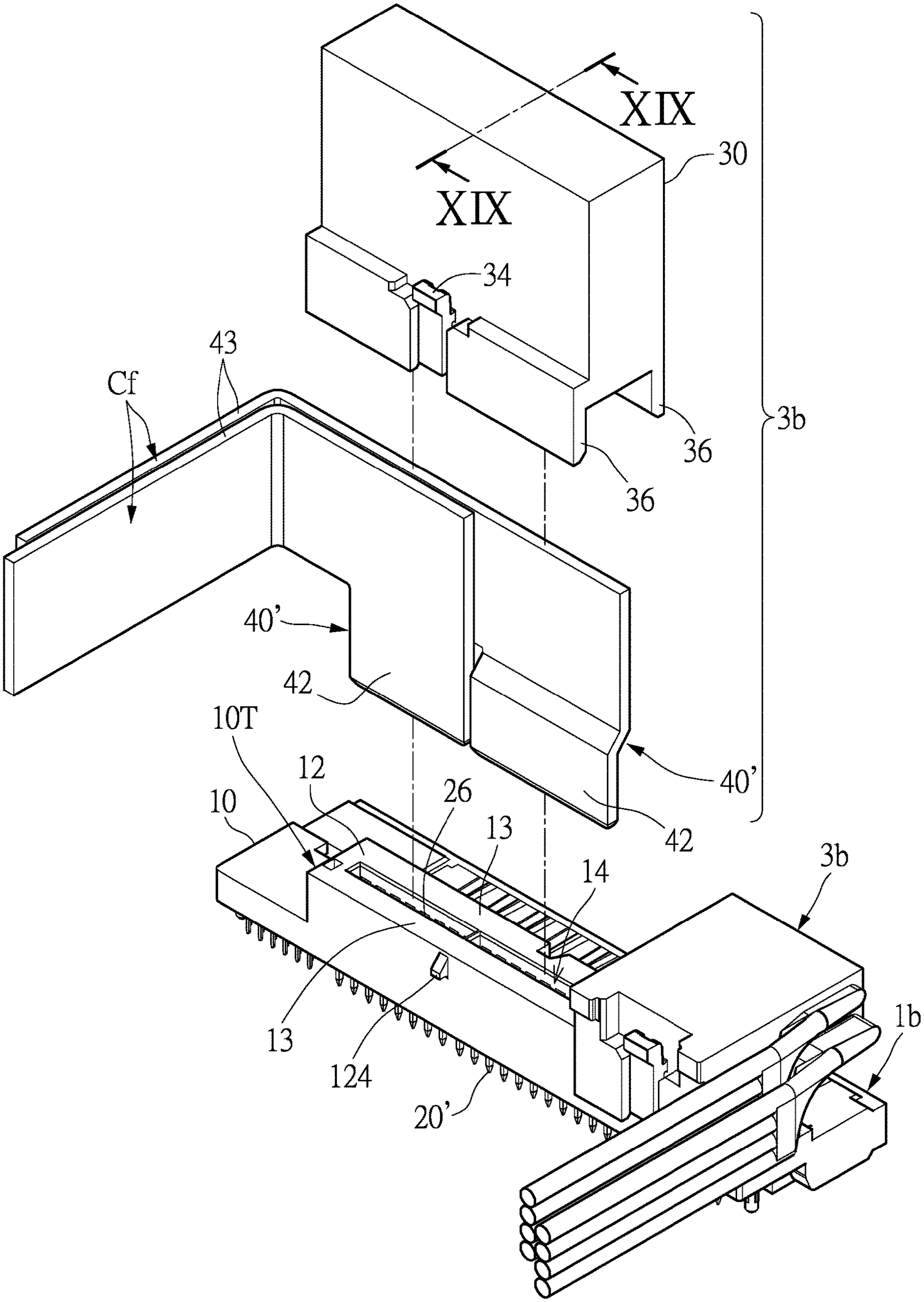
FIG. 18 is a perspective view showing the connector assembly having the shunt structure being partially assembled according to a sixth embodiment of the present disclosure.
Figure 19:
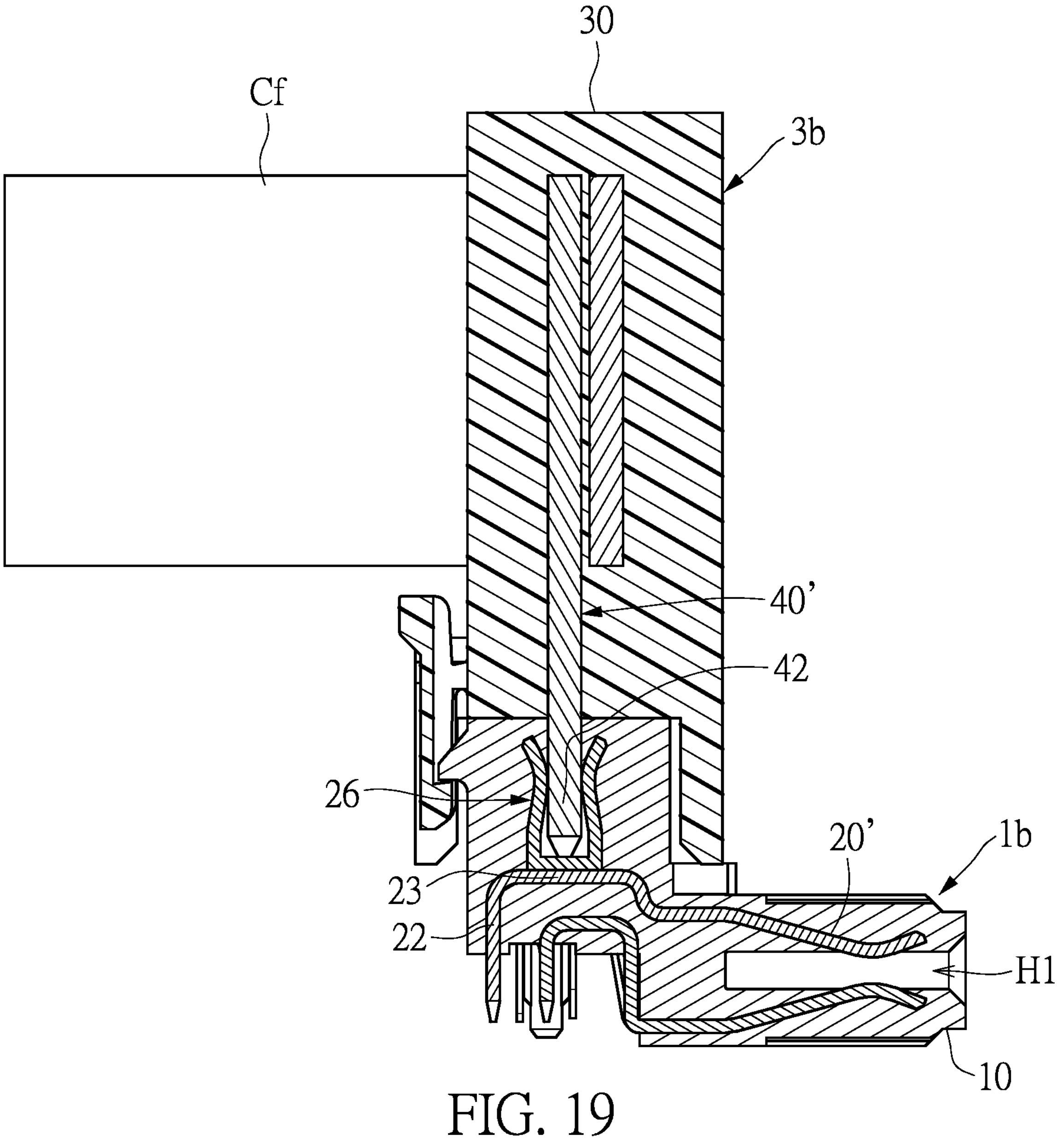
FIG. 19 is a sectional view taken along line XIX-XIX of FIG. 18 according to the present disclosure.

Referring to FIG. 18 and FIG. 19, a sixth embodiment of the present disclosure provides a connector assembly having a shunt structure, which includes a first connector 1*b* and a second connector 3*b*. The first connector 1*b* includes the first insulating housing 10 and the plurality of first power terminals 20'. The second connector 3*b* includes the second insulating housing 30. Similar to the previous embodiment, the adapter socket 10T includes the two lateral walls 13 and the two limiting side walls 12 that are arranged to form a rectangular shape, and at least one exposed area 14 disposed therein. Each of the exposed areas 14 has at least one shunt slot configured therein, and another end of the shunt slot is connected to the exposed hole 140. What is different from the previous embodiment is that no wire cable is used in the present embodiment. That is, instead of using stranded conductive fibers, plate metals Cf (e.g., copper bars) are used to transmit the electric current, so that a greater electric current can be transmitted. An end of the plate metals Cf is utilized as the shunt power terminals 40' in the second connector 3*b*, and the shunt contact portions 42 thereof are perpendicular to the bottom surface of the second insulating housing 30 and are inserted into the shunt slot, so as to be electrically connected to the first power terminals 20' of the first connector 1*b* by being mated with at least one of the second A contact portion and the second B contact portion (i.e., the forked contact member 26) of the adapter socket 10T. In other words, the shunt power terminals 40' of the second connector 3*b* are an extension of the plate metals Cf. While one end of the shunt power terminals (utilized as the shunt contact portions 42) is inserted into a corresponding shunt slot of the adapter socket 10T, another end thereof (utilized as the shunt legs 43) extends out of the second insulating housing 30 and is electrically and directly connected to the electronic component without a wire cable. Referring to FIG. 18, since there are two shunt slots located on the same plane, front ends of the shunt contact portions 42 of the shunt power terminals 40' are also located on the same plane. In order for the plate metals of the same direction to be arranged in a staggered manner, at least one of the plate metals Cf has a stepped structure configured along a direction that is perpendicular to a plate-shaped surface of the plate metals Cf (that is, being perpendicular to a direction of the shunt slots in the present embodiment). In this way, the plate metals Cf are arranged in a staggered manner at positions which are perpendicular to the plate-shaped surface. The shunt legs 43 of the plate metals Cf each have at least one bent portion or are L-shaped, so that the plate metals Cf can change a direction along the adjacent two sides of the second insulating housing 30. Accordingly, the direction of the plate metals Cf can be adjusted when an overall size of the second connector 3*b* is at its minimum.

A clamping method of the present embodiment is similar to that of the previous embodiment, and will not be reiterated herein.

Seventh Embodiment

Figure 20:
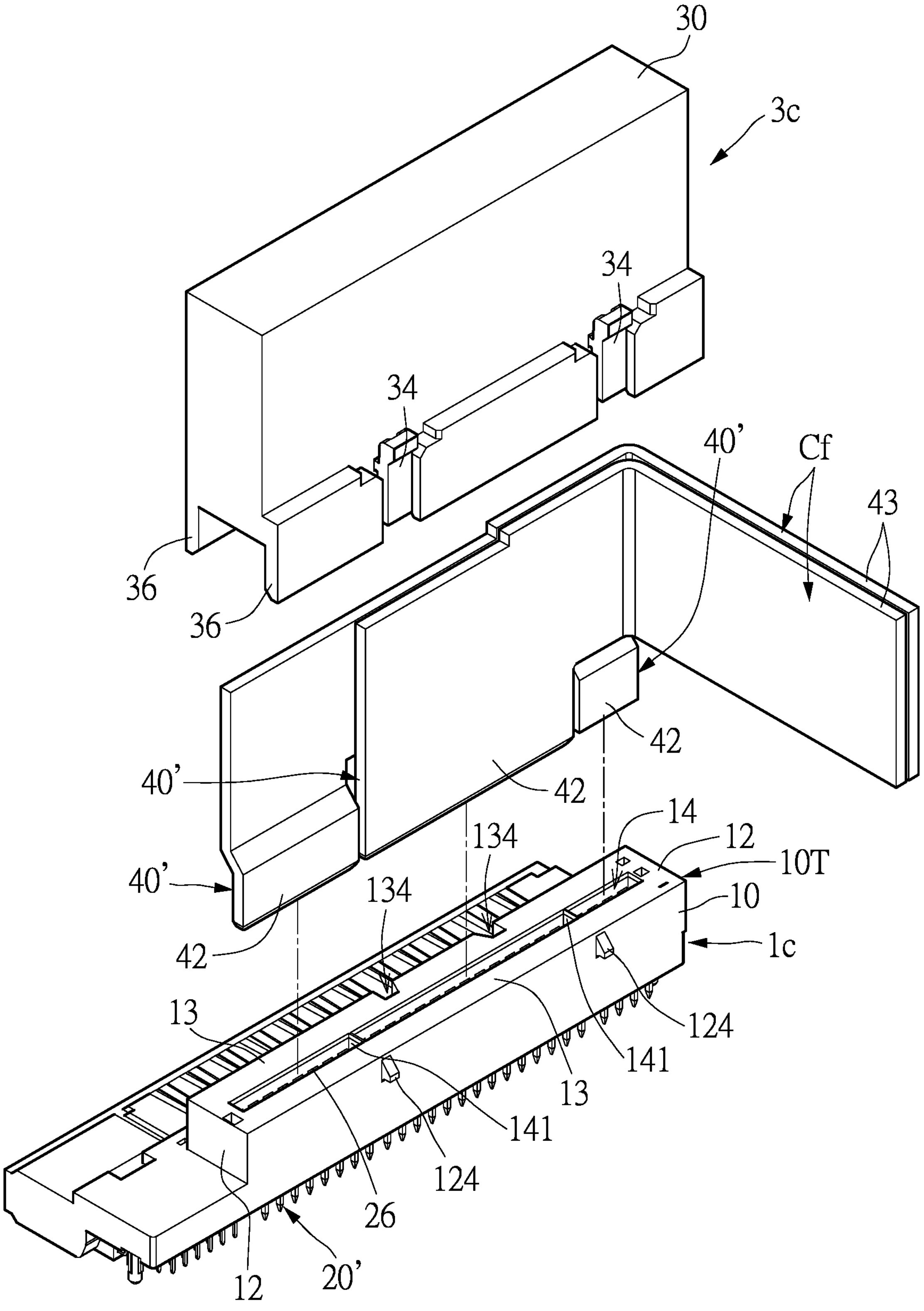
FIG. 20 is a perspective exploded view of the connector assembly having the shunt structure according to a seventh embodiment of the present disclosure.

Referring to FIG. 20, a seventh embodiment of the present disclosure provides a connector assembly having a shunt structure, which includes a first connector 1*c* and a second connector 3*c*. The first connector 1*c* includes the first insulating housing 10 and the plurality of first power terminals 20'. The second connector 3*c* includes the second insulating housing 30. An end (the shunt contact portion 42 which is located at the bottom of the second insulating housing 30) of the plate-shaped shunt power terminal 40' is inserted into the corresponding shunt slot of the adapter socket 10T, and another end thereof is used as the shunt leg 43 to extend out of the rear end surface of the second insulating housing 30. The rear end surface and the bottom are adjacent to each other, and are preferably perpendicular to each other. What is different from the previous embodiment is that one of the two shunt power terminals 40' have two shunt contact portions 42, which are configured on left and right sides of the shunt contact portion 42 of another one of the two shunt power terminals 40'. The middle shunt contact portion 42 is inserted into a middle shunt slot of the adapter socket 10T, and the shunt contact portions 42 on the left and right sides are respectively inserted into two shunt slots on left and right sides. The two shunt slots are each separated from the middle shunt slot by the separating wall 141. One of the two shunt power terminals 40' is electrically connected to the power potential, and another one of the shunt power terminals 40' is electrically connected to the ground potential. For example, the shunt power terminal 40' that has the two shunt contact portions 42 on the left and right sides is electrically connected to the ground potential, and the shunt power terminal 40' that has the middle shunt contact portion 42 is electrically connected to the power potential. At least one of the two lateral walls 13 is configured to have at least one guide slot 134, and the second connector 3*c* has a corresponding guided portion (not shown in the figures) that is located on a long side of the rectangular second insulating housing 30. When the second connector 3*c* is inserted into the adapter socket 10T, the guided portion slides along the guiding slot 134 to provide a positioning function. A clamping method of the present embodiment is similar to that of the sixth embodiment, in which multiple groups of the clamping arms 34 and the clamping portions 124 are provided.

Eighth Embodiment

Figure 21:
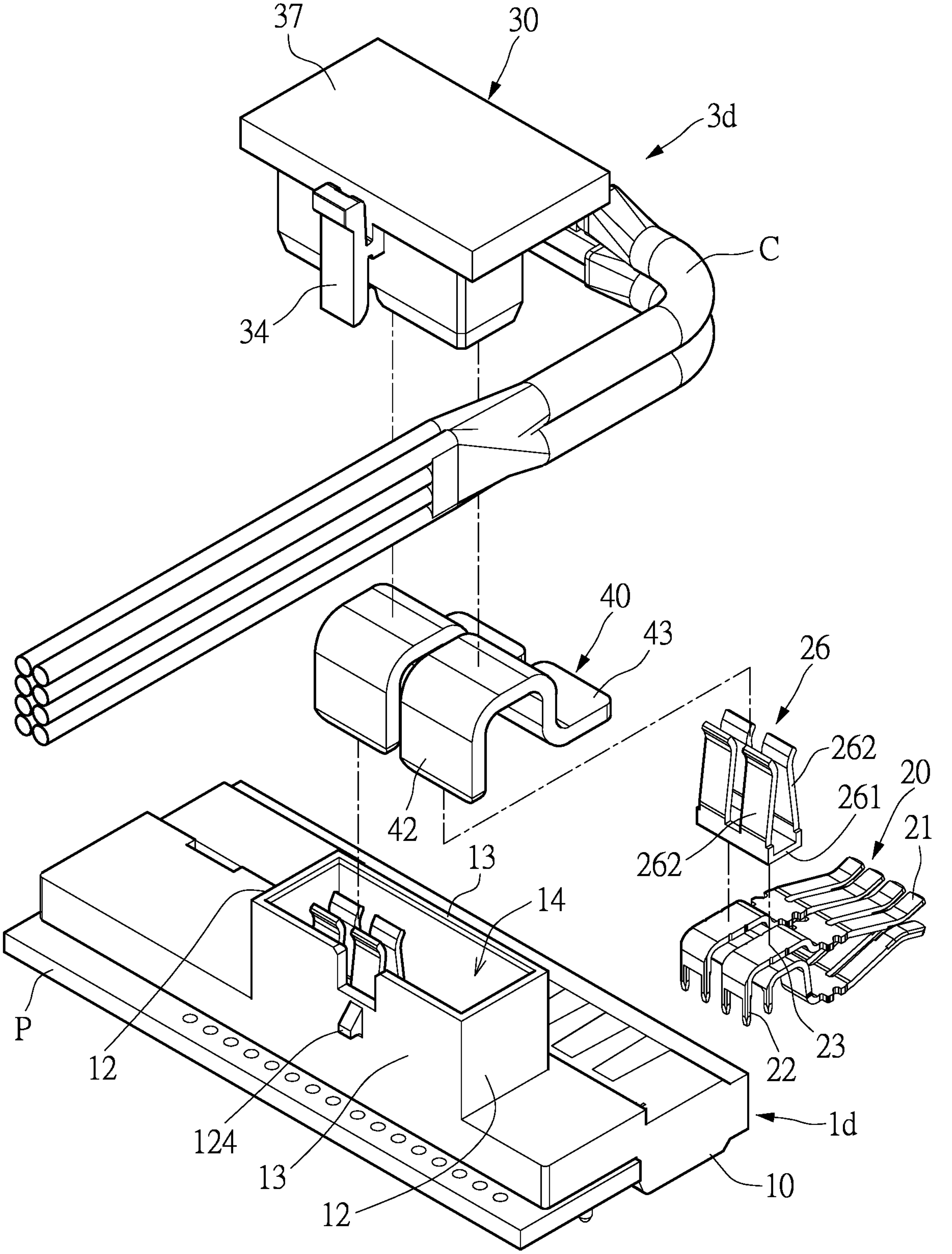
FIG. 21 is a perspective exploded view of the connector assembly having the shunt structure according to an eighth embodiment of the present disclosure.
Figure 22:
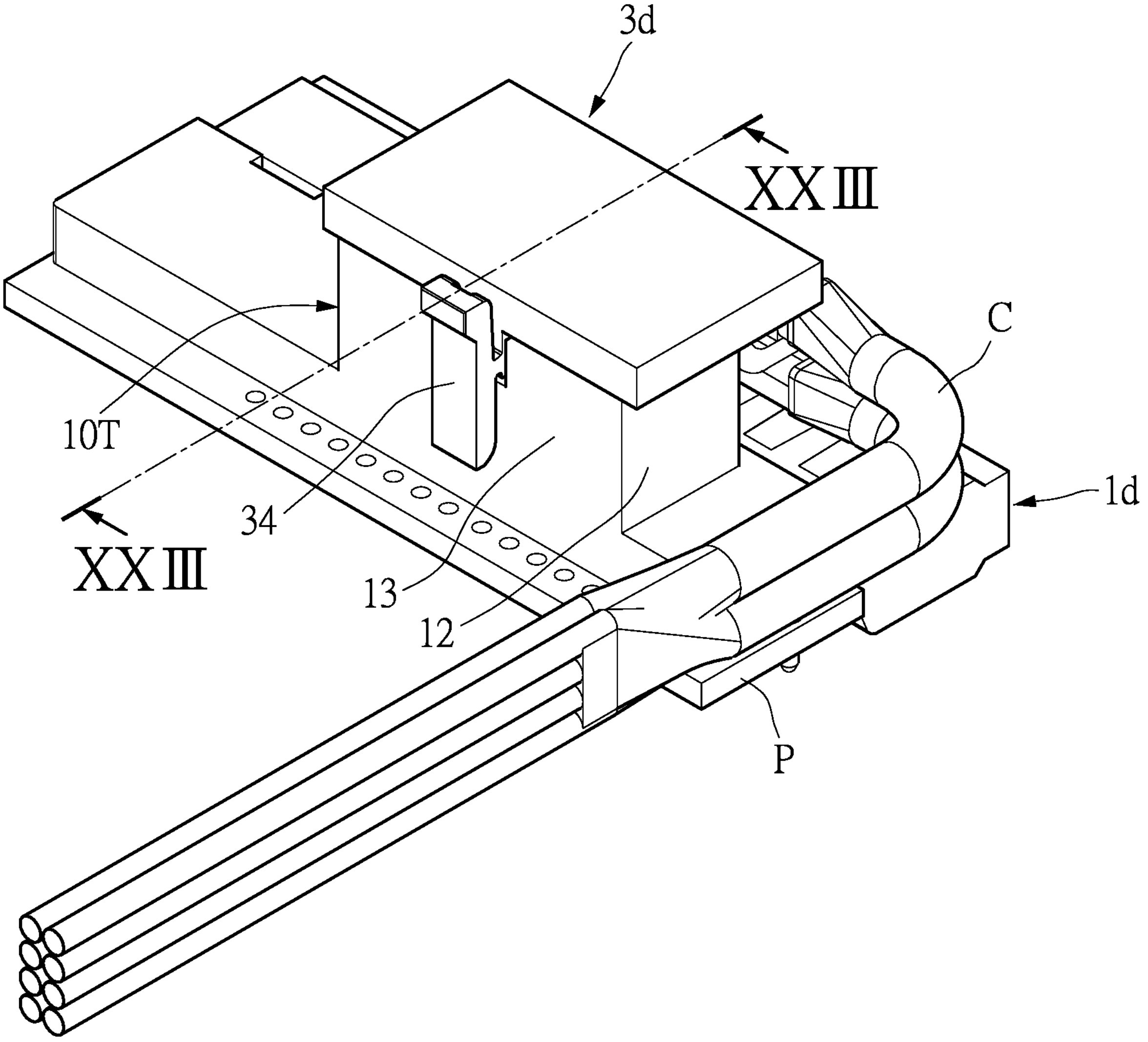
FIG. 22 is a perspective assembled view of the connector assembly having the shunt structure according to the eighth embodiment of the present disclosure.
Figure 23:
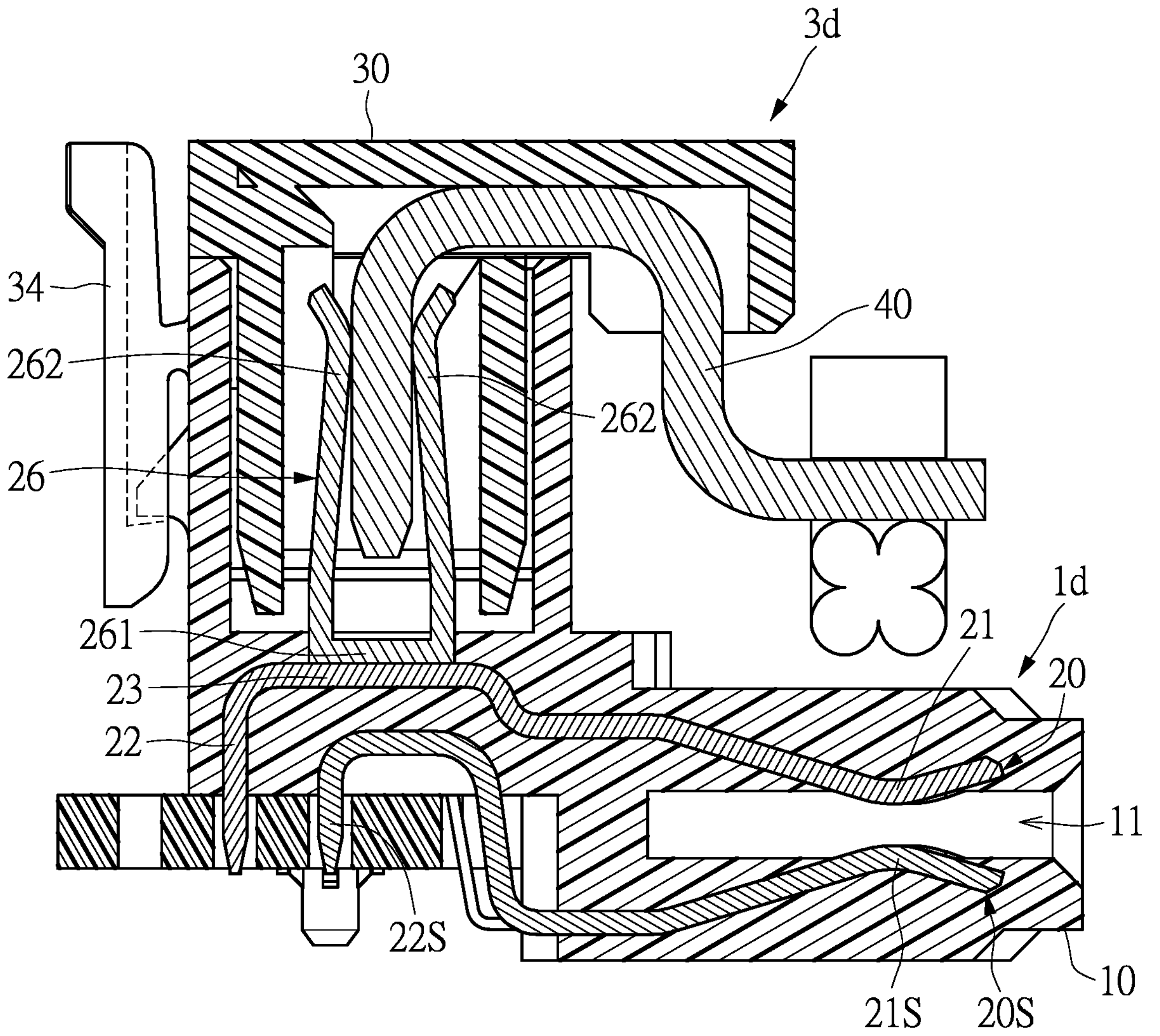
FIG. 23 is a sectional view taken along line XXIII-XXIII of FIG. 22 according to the present disclosure.

Referring to FIG. 21 to FIG. 23, an eighth embodiment of the present disclosure provides a connector assembly having a shunt structure, which includes a first connector 1*d* and a second connector 3*d*. The first connector 1*d* includes the first insulating housing 10 and the plurality of first electrical terminals 20. The second connector 3*d* includes the second insulating housing 30.

Similar to the fifth embodiment, the forked contact member 26 is additionally disposed on the top surface of the middle portion 23 of the first electrical terminals 20. The forked contact member 26 has the level portion 261 and the pair of B contact arms 262 that respectively extend out of the exposed hole from the two sides of the level portion 261 in an upward direction. The first electrical terminals 20 can be arranged with a second electrical terminal 20S that in pairs to form a two-piece configuration, and the level portion 261 is connected to only the middle portion 23 of the first electrical terminals 20. In addition, the shunt contact portion 42 of the shunt electrical terminal 40 of the second connector 3*d* is plate-shaped. After the second connector 3*d* is plugged into the first connector 1*d*, the forked contact member 26 clutches the plate-shaped shunt contact portion 42.

Ninth Embodiment

Figure 24:
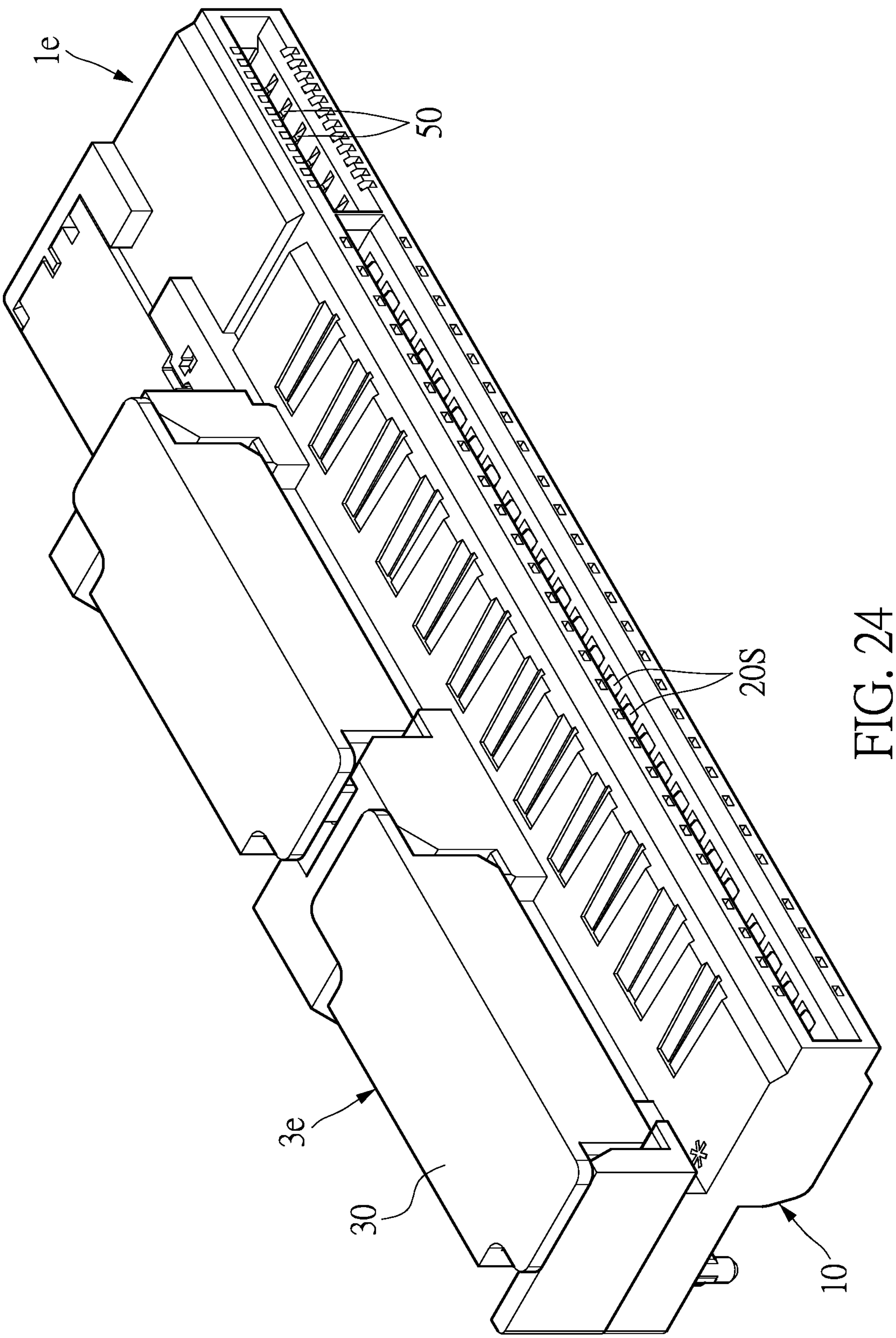
FIG. 24 is a perspective assembled view of the connector assembly having the shunt structure according to a Ninth embodiment of the present disclosure.

Referring to FIG. 24, a Ninth embodiment of the present disclosure provides a connector assembly having a shunt structure, which includes a first connector 1*e* and a second connector 3*e*. The first connector 1*e* includes the first insulating housing 10, the plurality of first electrical terminals 20, the plurality of second electrical terminals 20S, and a plurality of first signal terminals 50. The first side surface of the first insulating housing 10 is rectangular in shape. The second connector 3*e* includes the second insulating housing 30. The first connector 1*e* has two input interfaces, one of which is a power input interface and another one of which is a signal input interface. Similarly, the first connector 1*e* has two output interfaces, one of which is a power output interface and another one of which is a signal output interface.

The power input interface and the signal input interface are both located at a first side surface of the first connector 1*e*, and are two independent shunt slots. The first signal terminals 50 are pins that can be used to transmit electric current signals less than 0.5 A.

It should be noted that, while the heat dissipation groove or the heat dissipation through hole is not specifically drawn in the figures for the fifth embodiment to the Ninth embodiment of the present disclosure, at least one of the heat dissipation groove or the heat dissipation through hole can be configured in the second insulating housing 30 (preferably being parallel or perpendicular to the bottom surface) in an actual application, as shown in the first to the fourth embodiments.

Beneficial Effects of the Embodiments

The present disclosure has the following beneficial effects: According to the electrical terminal assembly and the first electrical connector provided in the present disclosure, a first A contact portion and a second A contact portion are arranged side by side to form a first port for a matching component to be plugged in, a first B contact portion and a second B contact portion are arranged side by side and form a second port for a second electrical connector to be plugged in, and a first pin portion and a second pin portion are used for being plugged into a circuit board, to provide an electrical connector with an electrical terminal assembly capable of performing a current shunting function, which can additionally shunt a current to other components in a single electrical connector. Therefore, the first electrical connector provided in the present disclosure is an improvement over the prior-art electrical connector that usually transmits a current through only a single output interface. If the first electrical connector provided in the present disclosure is mounted in an electronic apparatus instead of the prior-art electrical connector, space of the electronic apparatus can be effectively saved.

The contents disclosed above are merely the preferred and feasible embodiments of the present disclosure, and do not limit the scope of the patent application of the present disclosure. Therefore, all equivalent technical changes made by using the contents of this specification and the drawings of the present disclosure are included in the scope of the patent application of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A shunt device, used to be mated with a shunt socket of a connector configured on a circuit board so as to shunt electric current of the connector, the shunt device comprising:

an insulating housing having a bottom surface; and a first electrical terminal fixed on the insulating housing, wherein the first electrical terminal has:

a first plate contact portion that is perpendicular to the bottom surface, for connecting at least one electrical terminal inside the shunt socket to shunt electric current; and a first leg that extends from the first plate contact portion and has a flat portion for connecting to at least one cable, and the flat portion is perpendicular to the first plate contact portion.

2. The shunt device according to claim 1, further comprising a second electrical terminal, fixed in the insulating housing and isolated from the first electrical terminal, wherein the second electrical terminal has a second plate contact portion and a second leg extending from the second plate contact portion for connecting to at least one cable.

3. The shunt device according to claim 1, wherein the insulating housing has four sides, and the bottom surface is adjacent to the four sides, and a guided portion is formed on at least one of the four sides of the insulating housing.

4. The shunt device according to claim 3, wherein the insulating housing has a latch arm located on one of the four sides.

5. The shunt device according to claim 4, wherein the insulating housing has a guided portion located on another side of the four sides, and the another side is opposite to the side that the latch arm is located on.

6. A connector having a shunt structure, comprising:

an insulating housing, having a first side surface and a second side surface, the first side surface having an input interface provided for insertion of a power supply component along a first direction, and the second side surface having an output interface, wherein a longitudinal direction of the input interface is parallel to a second direction, and the first direction is perpendicular to the second direction;

a first shunt socket, located on a third side surface of the insulating housing and having a clamping portion on a side wall; and a plurality of electrical terminals, each of the electrical terminals having a contact portion and a leg, each of the contact portions extending into the input interface, and each of the legs extending to the output interface;

wherein a first part of the electrical terminals has a shunt contact portion extending into the first shunt socket.

7. The connector according to claim 6, further comprising a second shunt socket located on the third side surface, wherein a second part of the electrical terminals has a shunt contact portion extending into the second shunt socket.

8. The connector according to claim 7, wherein the first part of the electrical terminals provides a power supply potential and the second part of the electrical terminals provides a ground potential.

9. The connector according to claim 7, wherein the first shunt socket and the second shunt socket respectively have a key different with each other.

10. The connector according to claim 6, wherein the first shunt socket and the insulating housing are independent from each other.

11. The connector according to claim 6, wherein the first shunt socket has a guiding slot on another side wall.

12. The connector according to claim 6, wherein the first shunt socket has at least two shunt slots and any two adjacent shunt slots thereof are separated by a separating wall.

13. A connector assembly, comprising:

a first connector, having a first housing and a plurality of first electrical terminals, wherein the plurality of first electrical terminals commonly define a slot for receiving current provided by a matching component;

a first shunt socket, located on a side of the first housing and having a clamping portion on a side wall of the first shunt socket; and a second connector, having a second housing and at least one second electrical terminal, the at least one second electrical terminal having a plate contact portion, and the second housing having a latch arm; when the second connector is mated with the first shunt socket, the latch arm and the clamping portion are latched together, and the plate contact portion is electrically connected with at least one of the first electrical terminals for shunting current.

14. The connector assembly according to claim 13, wherein the first shunt socket has at least one guiding slot on another side wall, and the second connector has at least one guided portion, when the second connector is mated with the first shunt socket, the at least one guided portion slides along the at least one guiding slot.

15. The connector assembly according to claim 14, further comprising a second shunt socket located on the side of the first housing, wherein the second shunt socket has a key for avoiding the second connector completely being mated therewith.

16. The connector assembly according to claim 13, wherein the at least one electrical terminal has a leg extending from the plate contact portion for connecting at least one cable.

17. The connector assembly according to claim 13, further comprising a signal input interface, wherein the signal input interface has a signal slot independent from the slot.

18. The connector assembly according to claim 13, wherein the first shunt socket has at least two shunt slots and any two adjacent shunt slots thereof are separated by a separating wall.

* * * * *